US012781856B2

(12) United States Patent
Nakayama

(10) Patent No.: US 12,781,856 B2
(45) Date of Patent: Nov. 3, 2026

(54) SEALING DEVICE, SEALING STRUCTURE, AND SEALING STRUCTURE ASSEMBLY METHOD

(71) Applicant: NOK CORPORATION, Tokyo (JP)

(72) Inventor: Kenichi Nakayama, Kitaibaraki (JP)

(73) Assignee: NOK CORPORATION (JP)

( * ) Notice: Subject to any disclaimer, the term of this patent is extended or adjusted under 35 U.S.C. 154(b) by 0 days.

(21) Appl. No.: 18/880,784

(22) PCT Filed: Jul. 19, 2023

(86) PCT No.: PCT/JP2023/026416
§ 371 (c)(1),
(2) Date: Jan. 2, 2025

(87) PCT Pub. No.: WO2024/019087
PCT Pub. Date: Jan. 25, 2024

(65) Prior Publication Data
US 2026/0002589 A1 Jan. 1, 2026

(30) Foreign Application Priority Data
Jul. 21, 2022 (JP) ................................ 2022-116173

(51) Int. Cl.
*F16J 15/24* (2006.01)
*F16J 15/3276* (2016.01)
*F16J 15/3232* (2016.01)

(52) U.S. Cl.
CPC ........... *F16J 15/24* (2013.01); *F16J 15/3276* (2013.01); *F16J 15/3232* (2013.01)

(58) Field of Classification Search
CPC ...... F16J 15/32; F16J 15/3208; F16J 15/3232; F16J 15/3268; F16J 15/3276; F16J 15/24; F16J 15/48
See application file for complete search history.

(56) References Cited

U.S. PATENT DOCUMENTS 2,360,731 A * 10/1944 Smith ...................... F16J 15/32 277/455
2,553,222 A * 5/1951 Gunn .................. F16J 15/0881 285/918

(Continued)

FOREIGN PATENT DOCUMENTS

CN 112728153 A 4/2021
EP 0886091 A1 12/1998

(Continued)

OTHER PUBLICATIONS

International Search Report of the International Searching Authority, issued in PCT/JP2023/026416, mailed Oct. 3, 2023; ISA/JP (5 pages).

(Continued)

*Primary Examiner* — Christine M Mills
*Assistant Examiner* — L. Susmitha Koneru
(74) *Attorney, Agent, or Firm* — Harness, Dickey & Pierce, P.L.C.

(57) ABSTRACT

A sealing device is assembled between a cylindrical housing and a rotor located inside the housing coaxially with the housing and rotatable about an axis. The sealing device includes a first seal and a second seal. The first seal includes a body to extend along an outer periphery of the rotor, a port through the body in a radial direction of the body, and a groove on an outer circumferential surface of the body, surrounding the port when the outer circumferential surface is viewed in the radial direction, and including a pair of slopes flaring toward the housing. The second seal is attachable to the groove to be in contact with the pair of slopes and seals a gap between the housing and the first seal.

16 Claims, 19 Drawing Sheets

(56) References Cited

U.S. PATENT DOCUMENTS

| | | | | |
|---|---|---|---|---|
| 3,895,815 | A * | 7/1975 | Panigati | F16J 15/3204 277/910 |
| 4,256,314 | A * | 3/1981 | Berglund | F16J 15/46 277/587 |
| 4,372,624 | A * | 2/1983 | Neilson | F16C 33/72 277/587 |
| 5,579,718 | A * | 12/1996 | Freerks | H10P 72/0441 118/733 |
| 5,676,348 | A | 10/1997 | Ungchusri et al. | |
| 6,065,757 | A * | 5/2000 | Schneider | F16J 15/024 277/642 |
| 6,296,255 | B1 * | 10/2001 | Hashimoto | H01J 37/32431 277/927 |
| 8,020,638 | B2 * | 9/2011 | Chellappa | E21B 10/25 175/371 |
| 9,243,715 | B2 * | 1/2016 | Slack | F16J 15/48 |
| 2008/0142752 | A1 | 6/2008 | Matzner | |
| 2013/0277917 | A1 * | 10/2013 | Orlowski | F16J 15/002 277/346 |
| 2014/0264126 | A1 * | 9/2014 | Hedger | B05B 7/2497 251/313 |
| 2016/0201811 | A1 | 7/2016 | Hunter et al. | |
| 2018/0347698 | A1 * | 12/2018 | Saitou | F04B 39/123 |
| 2020/0386168 | A1 * | 12/2020 | Nasman | F16J 15/3404 |
| 2023/0392666 | A1 * | 12/2023 | Koyama | F16F 9/368 |

FOREIGN PATENT DOCUMENTS

| | | | |
|---|---|---|---|
| GB | 2444822 | A | 6/2008 |
| JP | H4-111903 | U | 9/1992 |
| JP | 2018-96543 | A | 6/2018 |
| JP | 6812601 | B2 | 1/2021 |
| WO | 2022-130968 | A1 | 6/2022 |

OTHER PUBLICATIONS

Request for the Subission of an Opinion for corresponding Korean Patent Application No. 10-2025-7000226 dated Jun. 18, 2026, with English translation (18 Pages).

* cited by examiner

SEALING DEVICE, SEALING STRUCTURE, AND SEALING STRUCTURE ASSEMBLY METHOD

CROSS REFERENCE TO RELATED APPLICATIONS

This application is a 371 U.S. National Phase of International Application No. PCT/JP2023/026416, filed on Jul. 19, 2023, which claims priority to Japanese Patent Application No. 2022-116173, filed Jul. 21, 2022. The entire disclosures of the above applications are incorporated herein by reference.

FIELD

The disclosure relates to a sealing device, a sealing structure, and a method for assembling the sealing structure.

BACKGROUND

A known rotary valve device changes the flow state of a fluid flowing through multiple flow channels in a single mechanical system. For example, a thermal management system TM for an electric vehicle shown in FIG. 1 includes four circulation channels CF1, CF2, CF3, and CF4 through which a coolant flows, and a multiport valve V10 as an example of the rotary valve.

The circulation channel CF1 extends around a battery BT. The circulation channel CF2 extends around a heat exchanger R1 and includes a pump P1. The circulation channel CF3 extends around a heat exchanger R2 and a capacitor C2 and includes a tank RT. The circulation channel CF4 extends around an electronic component ED and an axle AX and includes a pump P2.

The multiport valve V10 can merge the circulation channels CF1 to CF4 to one another. The multiport valve V10 includes a housing V2, a rotor V3, and a sealing device V4. The housing V2 includes multiple ports V2*a* connected to the circulation channels CF1 to CF4.

The rotor V3 is located inside the housing V2 in a manner rotatable about a central axis OV. The rotor V3 includes multiple ports V3*a* connectable to the ports V2*a*, and multiple channels V3*b* connecting two of the multiple ports V3*a*.

The sealing device V4 seals a gap between the housing V2 and the rotor V3 while allowing the coolant to flow between the ports V2*a* and the ports V3*a*.

The rotor V3 rotates to allow the multiport valve V10 to change the interconnected state of the circulation channels CF1 to CF4 and the flowing state of the coolant flowing through the circulation channels CF1 to CF4. Another circulating channel including an evaporator ER, an accumulator AR, a compressor CP, and a capacitor C1 also extends around the heat exchanger R2 and the capacitor C2.

A known rotary valve includes a valve body (specifically, a housing) including a valve chamber, a valve (specifically, a rotor) located inside the valve chamber and rotatable about a valve shaft, and seals located between the valve and the valve body and including a cylinder (specifically, a first seal) and an outer rib (specifically, a second seal), as described in Japanese Unexamined Patent Application Publication No. 2018-96543 (hereafter, Patent Literature 1).

The seals described in Patent Literature 1 include the cylinder and the outer rib that are integral with each other. The seals are formed from an elastic material such as synthetic rubber. The outer rib formed from an elastic material has a solid cross section. The outer rib incorporated in the valve generates a reaction force in response to a fitting force applied from the valve body toward the central axis of the cylinder and transmits the reaction force to the cylinder. The outer rib generates the reaction force resulting from an elastic force from the elastic material. The reaction force from the outer rib acts on the cylinder in the same direction as the fitting force, and increases the force from the inner circumference of the cylinder toward the axis. The inner circumference of the cylinder is in contact with the valve. Thus, an increased force from the cylinder may cause the seals to be less slidable on the valve. The increased force from the cylinder may also cause the seals to be assembled less easily on the valve.

One or more aspects of the disclosure are directed to a technique for reducing a reaction force in the radial direction transmitted from a second seal to a first seal during assembly.

SUMMARY

A first aspect of the disclosure provides a sealing device to be assembled between a housing being cylindrical and a rotor located inside the housing coaxially with the housing and rotatable about an axis, the sealing device comprising:

- a first seal including a body to extend along an outer periphery of the rotor, the first seal including
  - a port through the body in a radial direction of the body, and
  - a groove on an outer circumferential surface of the body and surrounding the port when the outer circumferential surface is viewed in the radial direction, the groove including a groove bottom parallel to the outer circumferential surface; and
- a second seal attachable to the groove to be in contact with the groove bottom, the second seal being configured to seal a gap between the housing and the first seal, the second seal including a bend bendable during assembly.

A second aspect of the disclosure provides a sealing device to be assembled between a housing being cylindrical and a rotor located inside the housing coaxially with the housing and rotatable about an axis, the sealing device comprising:

- a first seal including a body to extend along an outer periphery of the rotor, the first seal including
  - a port through the body in a radial direction of the body, and
  - a groove on an outer circumferential surface of the body and surrounding the port when the outer circumferential surface is viewed in the radial direction, the groove including a groove bottom parallel to the outer circumferential surface; and
- a second seal attachable to the groove to be in contact with the groove bottom, the second seal being configured to seal a gap between the housing and the first seal, the second seal including a bend bendable in a direction intersecting with the radial direction during assembly.

A third aspect of the disclosure provides a sealing device to be assembled between a housing being cylindrical and a rotor located inside the housing coaxially with the housing and rotatable about an axis, the sealing device comprising:

- a first seal including a body to extend along an outer periphery of the rotor, the first seal including
  - a port through the body in a radial direction of the body, and a groove on an outer circumferential surface of the body and surrounding the port when the outer circumferential surface is viewed in the radial direction, the groove including a groove bottom parallel to the outer circumferential surface; and a second seal attachable to the groove to be in contact with the groove bottom, the second seal being configured to seal a gap between the housing and the first seal, the second seal being bendable during assembly.

A fourth aspect of the disclosure provides a sealing device to be assembled between a housing being cylindrical and a rotor located inside the housing coaxially with the housing and rotatable about an axis, the sealing device comprising:

a first seal including a body to extend along an outer periphery of the rotor, the first seal including a port through the body in a radial direction of the body, and a groove on an outer circumferential surface of the body and surrounding the port when the outer circumferential surface is viewed in the radial direction, the groove including a groove bottom parallel to the outer circumferential surface; and a second seal attachable to the groove to be in contact with the groove bottom, the second seal being configured to seal a gap between the housing and the first seal, the second seal being bendable in a direction intersecting with the radial direction during assembly.

A fifth aspect of the disclosure provides a sealing structure, comprising:

a housing being cylindrical;

a rotor located inside the housing coaxially with the housing and rotatable about an axis;

a first seal including a body extending along an outer periphery of the rotor, the first seal including a port through the body in a radial direction of the body, and a groove on an outer circumferential surface of the body and surrounding the port when the outer circumferential surface is viewed in the radial direction, the groove including a groove bottom parallel to the outer circumferential surface; and a second seal attached to the groove and in contact with the groove bottom, the second seal being bent to seal a gap between the housing and the first seal.

A sixth aspect of the disclosure provides a sealing structure, comprising:

a housing being cylindrical;

a rotor located inside the housing coaxially with the housing and rotatable about an axis;

a first seal including a body extending along an outer periphery of the rotor, the first seal including a port through the body in a radial direction of the body, and a groove on an outer circumferential surface of the body and surrounding the port when the outer circumferential surface is viewed in the radial direction, the groove including a groove bottom parallel to the outer circumferential surface; and a second seal attached to the groove and in contact with the groove bottom, the second seal being bent in a direction intersecting with the radial direction to seal a gap between the housing and the first seal.

A seventh aspect of the disclosure provides a sealing device to be assembled between a housing being cylindrical and a rotor located inside the housing coaxially with the housing and rotatable about an axis, the sealing device comprising:

a first seal including a body to extend along an outer periphery of the rotor, the first seal including a port through the body in a radial direction of the body, and a groove on an outer circumferential surface of the body and surrounding the port when the outer circumferential surface is viewed in the radial direction, the groove including a pair of slopes flaring toward the housing; and a second seal attachable to the groove to be in contact with the pair of slopes, the second seal being configured to seal a gap between the housing and the first seal.

An eighth aspect of the disclosure provides a sealing device to be assembled between a housing being cylindrical and a rotor located inside the housing coaxially with the housing and rotatable about an axis, the sealing device comprising:

a first seal including a body to extend along an outer periphery of the rotor, the first seal including a port through the body in a radial direction of the body, and a groove on an outer circumferential surface of the body and surrounding the port when the outer circumferential surface is viewed in the radial direction, the groove including a pair of slopes and a bottom end, each of the pair of slopes extending straight in a direction intersecting with the radial direction in a sectional view; and a second seal attachable to the groove to be in contact with the pair of slopes, the second seal being configured to seal a gap between the housing and the first seal, wherein the groove has a first clearance between the bottom end and the second seal, and the second seal is deformable toward the first clearance during assembly.

In another aspect of the disclosure, in the sealing device according to any one of the first to fourth, seventh, and eighth aspects, the second seal may have a hollow circular cross section.

In another aspect of the disclosure, in the sealing device according to any one of the first to fourth, seventh, and eighth aspects, the second seal may have a C-shaped cross section.

In another aspect of the disclosure, in the sealing device according to any one of the first to fourth, seventh, and eighth aspects, the second seal may have a substantially solid circular cross section and have an opening that is a slit extending from the outer periphery of the second seal toward a center of the second seal in the sectional view.

In another aspect of the disclosure, in the sealing device according to any one of the first to fourth, seventh, and eighth aspects, the second seal may have an outer end to be in contact with the housing. The housing may come in contact with the outer end during assembly, with the relative movement of the housing from a position in a first axial direction toward a position in a second axial direction opposite to the first axial direction.

ADVANTAGEOUS EFFECTS

The technique according to the above aspects of the disclosure can reduce a reaction force in the radial direction transmitted from the second seal to the first seal during assembly.

DETAILED DESCRIPTION

One or more embodiments of the disclosure will now be described with reference to the drawings.

A sealing structure 10 according to one or more embodiments of the disclosure is a rotary valve for changing the flow state of a fluid flowing through multiple flow channels in a single mechanical system (not shown).

(1) First Embodiment

Figure 1:
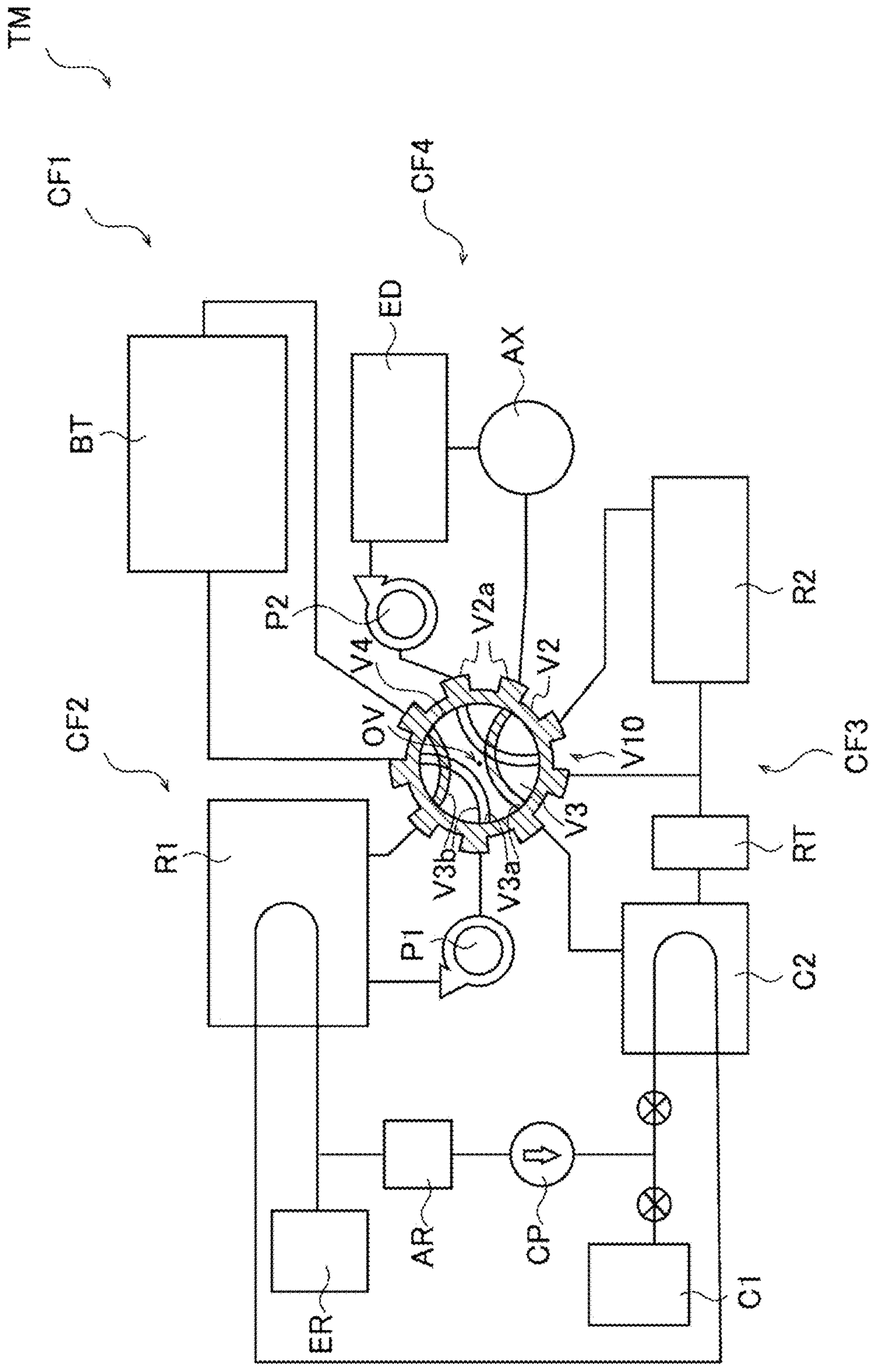
FIG. 1 is a schematic diagram of a cooling system for an electric vehicle including a rotary valve device.
Figure 2:
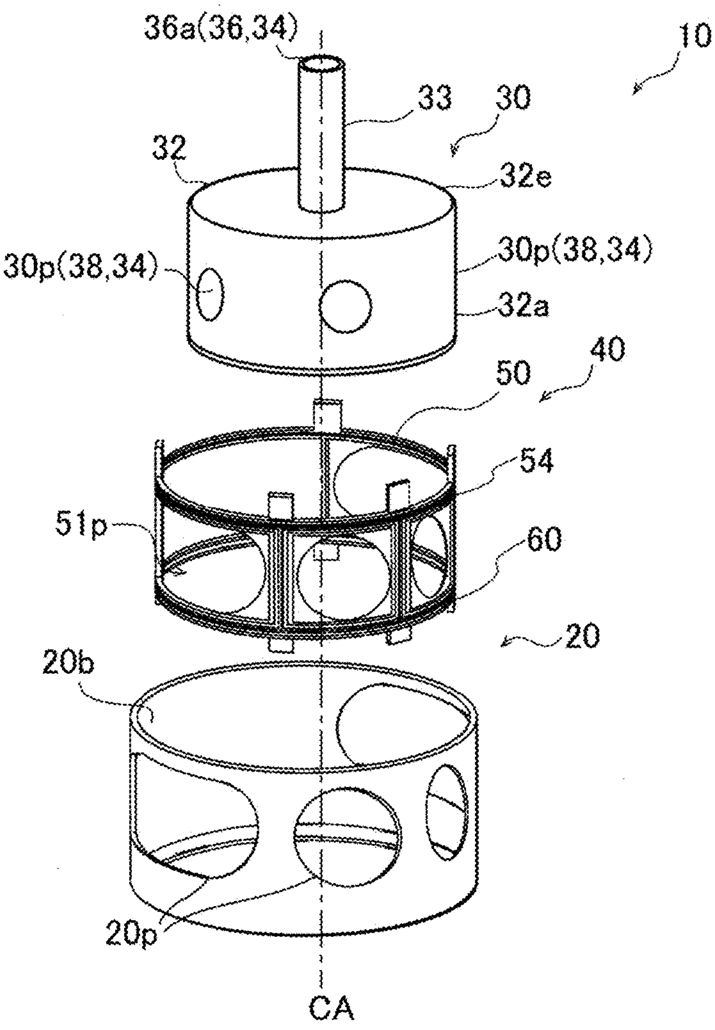
FIG. 2 is an exploded perspective view of a sealing structure according to a first embodiment.
Figure 3:
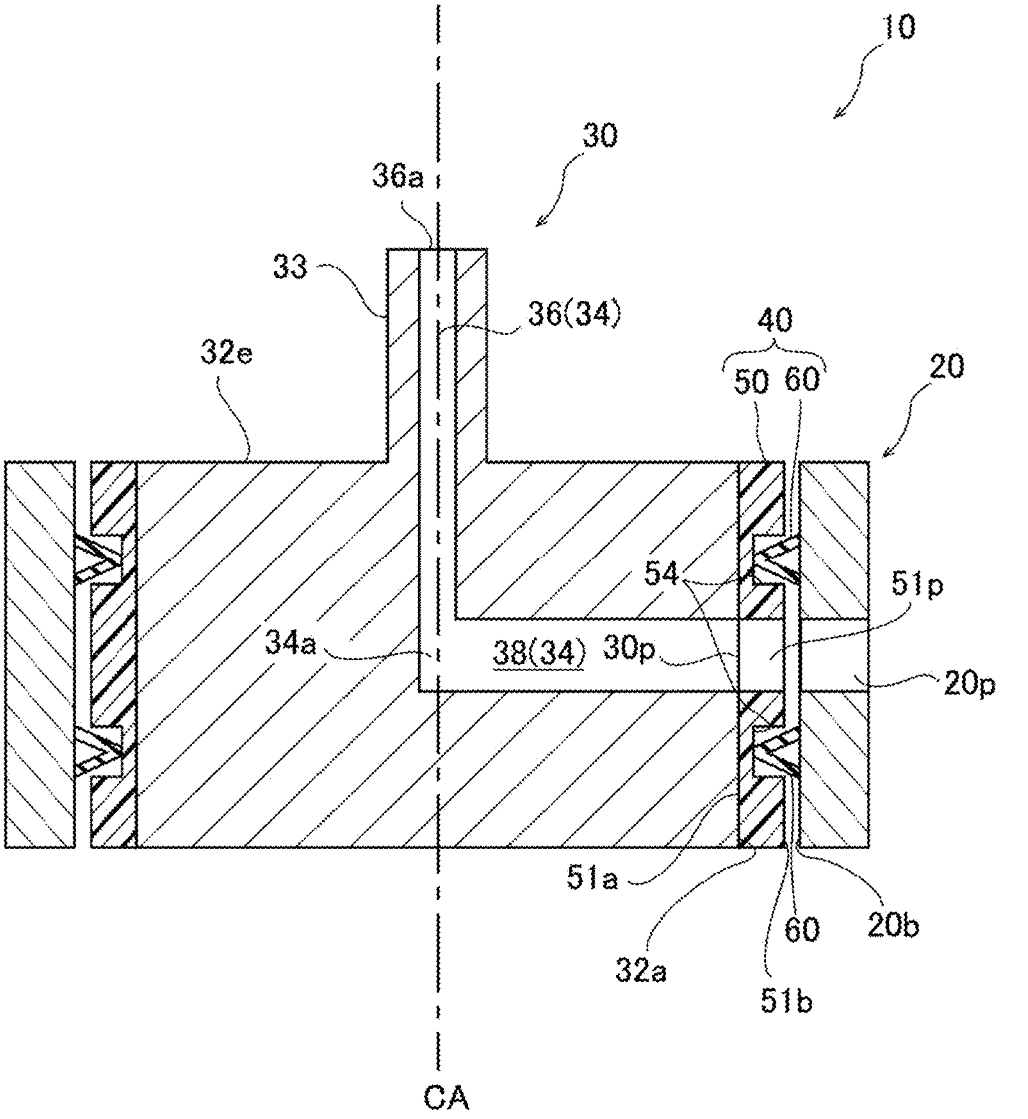
FIG. 3 is a longitudinal sectional view of the sealing structure according to the first embodiment.

As shown in FIGS. 2 and 3, the sealing structure 10 according to a first embodiment includes a housing 20, a rotor 30, and a sealing device 40.

The housing 20 is hollow and cylindrical, and extends along a central axis CA. The housing 20 has multiple (four in the present embodiment) port holes 20*p* in its cylindrical surface. The port holes 20*p* are arranged in the circumferential direction. Each port hole 20*p* extends through the cylindrical surface in the radial direction. The housing 20 has an inner circumferential surface 20*b*. The housing 20 includes locking members (not shown). The housing 20 is engageable with first engaging portions (not shown) arranged around the sealing structure 10 in the mechanical system (not shown). The housing 20 is fixed to the mechanical system with the locking members engaged with the first engaging portions.

The rotor 30 is substantially cylindrical and located inside the housing 20 coaxially with the housing 20. The rotor 30 is rotatable about the central axis CA. The rotor 30 includes a body 32, a protrusion 33, and flow channels 34.

The body 32 is cylindrical and extends along the central axis CA. The body 32 has an outer periphery 32*a* and multiple (two in the present embodiment) port holes 30*p*. The port holes 30*p* are arranged on the outer periphery 32*a* in the circumferential direction.

The protrusion 33 is cylindrical and extends along the central axis CA. The protrusion 33 protrudes from an end face 32*e* of the body 32. The protrusion 33 has an opening 36*a* in its end face.

The flow channels 34 are inside the rotor 30. The flow channels 34 include a first flow channel 36, multiple second flow channels 38, and a joint 34*a*.

The first flow channel 36 extends from the opening 36*a* of the protrusion 33 into the body 32 in the axial direction. The second flow channels 38 extend from the respective port holes 30*p* in the body 32 into the body 32 in the radial direction. The second flow channels 38 correspond to the respective port holes 30*p*. The first flow channel 36 and the second flow channels 38 merge at the joint 34*a*.

The rotor 30 may not have the first flow channel 36 or the opening 36*a*. The multiple second flow channels 38 may connect with each other.

When the rotatable rotor 30 is in a predetermined phase, each port hole 30*p* in the rotor 30 faces the corresponding port hole 20*p* in the housing 20. A fluid flowing through the second flow channels 38 flows through ports 51*p* in the sealing device 40 (described later) to the port holes 20*p* in the housing 20 facing the respective port holes 30*p*.

Combinations of the port holes 30*p* in the rotor 30 and the port holes 20*p* in the housing 20 facing the respective port holes 30*p* may change as appropriate for the phase of the rotor 30. More specifically, when the rotor 30 rotates and in a different phase, the combinations of the port holes 30*p* and the port holes 20*p* change. This changes the flow state of the fluid flowing through the mechanical system.

The fluid flowing through the sealing structure 10 is, for example, a liquid such as oil or an extended life coolant (ELC).

Sealing Device 40

As shown in FIG. 3, the sealing device 40 is assembled between the housing 20 and the rotor 30. The sealing device 40 includes a first seal 50 and second seals 60.

First Seal 50

The first seal 50 is substantially cylindrical. As shown in FIG. 3, the first seal 50 is placed along the outer periphery 32*a* of the rotor 30 during assembly. The first seal 50 includes a body 51, multiple (four in the present embodiment) ports 51*p*, and grooves 54.

Figure 4:
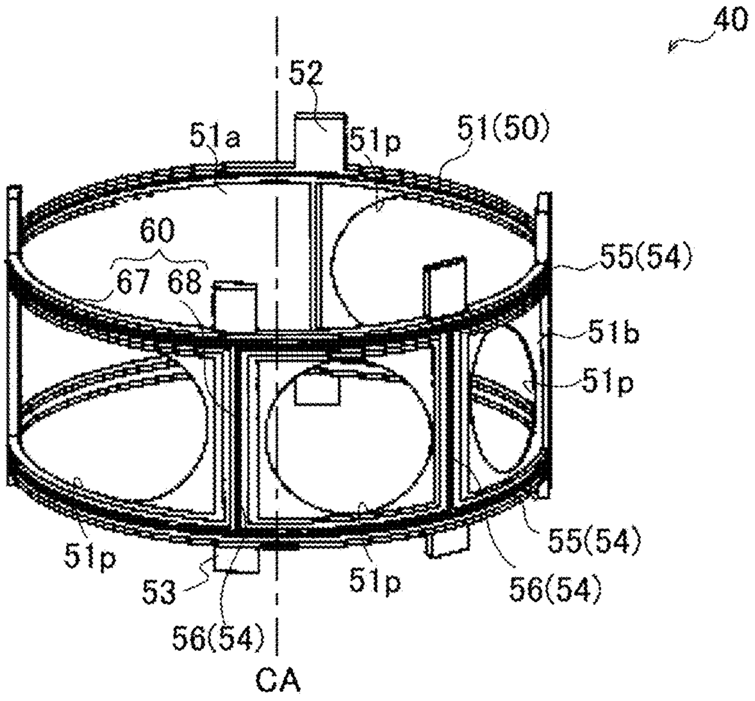
FIG. 4 is a perspective view of a sealing device according to the first embodiment.

As shown in FIG. 4, the body 51 is hollow and cylindrical, and extends along the central axis CA. The body 51 has an inner circumferential surface 51*a* and an outer circumferential surface 51*b*. The inner circumferential surface 51*a* of the body 51 faces the outer periphery 32*a* of the rotor 30 during assembly.

The body 51 is formed from a resin material. The body 51 may be formed from a thermoplastic resin material. The body 51 may be formed from, for example, a fluorine resin such as polytetrafluoroethylene (PTFE), an ethylene tetrafluoroethylene (ETFE) copolymer, or polychlorotrifluoroethylene (PCTFE). The body 51 may also be formed from an elastomer such as synthetic rubber. The material for the body 51 may be more rigid than the material for the second seals 60 (described later). The surface of the body 51 may have a lower coefficient of friction than the surfaces of the second seals 60.

The body 51 includes multiple locking portions 52 and multiple locking portions 53. Each locking portion 52 protrudes in a first axial direction along the central axis CA from a portion of the edge of the body 51 located in the first axial direction. Each locking portion 53 protrudes in a second axial direction opposite to the first axial direction from a portion of the edge of the body 51 located in the second axial direction. The multiple locking portions 52 and 53 are arranged in the circumferential direction of the body 51. The locking portions 52 and 53 are engageable with second engaging portions (not shown) arranged around the sealing structure 10 in the mechanical system (not shown). The body 51 is fixed relative to the mechanical system with the locking portions 52 and 53 engaged with the second engaging portions.

Each port 51*p* extends through the body 51 in the radial direction. The multiple ports 51*p* correspond to the respective port holes 20*p* in the housing 20.

The grooves 54 are recessed from the outer circumferential surface 51*b* of the body 51. The grooves 54 include annular grooves 55 and side grooves 56. As shown in FIG. 4, the annular grooves 55 and the side grooves 56 surround the ports 51*p* when the outer circumferential surface 51*b* is viewed in the radial direction. The annular grooves 55 extend around the outer circumferential surface 51*b* in the circumferential direction. The ports 51*p* are between the annular grooves 55 as a pair in the axial direction of the body 51. The side grooves 56 bridge between the pair of annular grooves 55. The ports 51*p* are between the side grooves 56 in the circumferential direction of the body 51.

Figure 5:
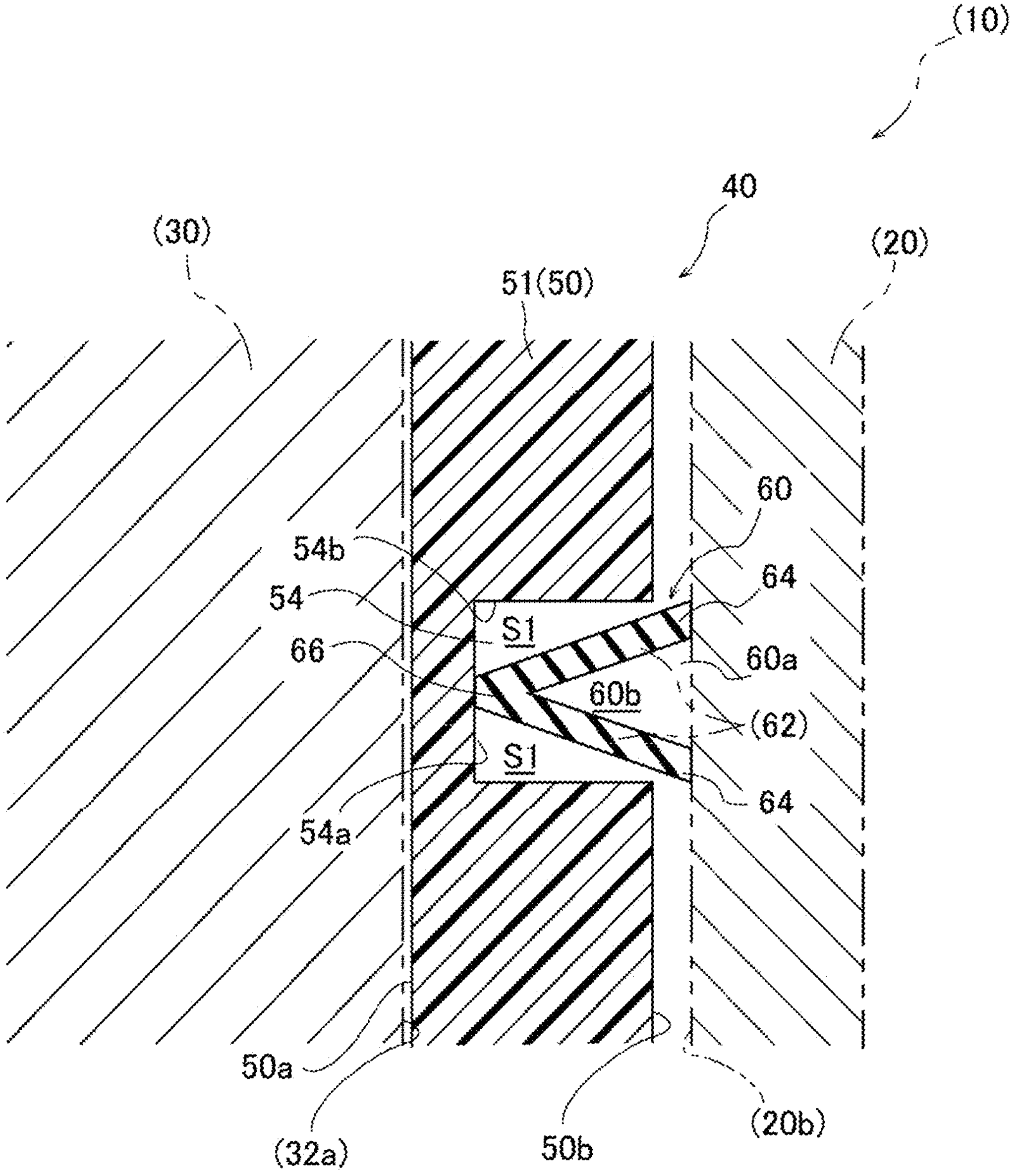
FIG. 5 is an enlarged sectional view of the sealing device according to the first embodiment.

The annular grooves 55 and the side grooves 56 have groove bottoms along the cylindrical surface parallel to the outer circumferential surface 51*b*. In other words, as shown in FIG. 5, each groove 54 has a groove bottom 54*a* parallel to the outer circumferential surface 51*b*. The groove 54 has groove walls 54*b* extending from the groove bottom 54*a* to the outer circumferential surface 51*b*.

The first seal 50 seals a gap between the inner circumferential surface 51*a* of the first seal 50 and the outer periphery 32*a* of the rotor 30. The first seal 50 may reduce external foreign objects entering an area in which the inner circumferential surface 51*a* of the first seal 50 and the outer periphery 32*a* of the rotor 30 face each other. The first seal 50 may not seal the fluid flowing through the sealing structure 10.

Second Seal 60

As shown in FIG. 4, the second seals 60 are arranged along the grooves 54 on the first seal 50. The second seals 60 are separate from the first seal 50. The second seals 60 include annular portions 67 and bridges 68. The annular portions 67 correspond to the pair of annular grooves 55 of the grooves 54. The bridges 68 correspond to the side grooves 56 of the grooves 54. The bridges 68 bridge between the annular portions 67 as a pair. The second seals 60 seal a gap between the first seal 50 and the housing 20.

The second seals 60 are formed from an elastomer such as synthetic rubber. When the fluid flowing through the sealing structure 10 is an ELC, the second seals 60 may be formed from ethylene propylene diene monomer (EPDM) rubber.

Each second seal 60 is formed from an elastomer substrate with a predetermined cross section. More specifically, each second seal 60 has a shape defined by extending the substrate continuously in a direction intersecting with the cross section of the substrate. In other words, each annular portion 67 has a shape defined by extending a cross section of the substrate continuously in an annular manner. Each bridge 68 has a shape defined by extending a cross section of the substrate continuously along the central axis CA, with the direction intersecting with a cross section of the substrate aligned with the central axis CA of the first seal 50.

As shown in FIG. 5, each second seal 60 has a V-shaped cross section. The second seal 60 has a thickness in a V-shaped cross section. The second seal 60 is open toward the housing 20 in a sectional view. In other words, the second seal 60 has an opening 60*a*. The opening 60*a* is open toward the housing 20. The second seal 60 has two opening ends 64 and a folded end 66 in a sectional view. The second seal 60 includes bends 62.

The opening 60*a* extends continuously in a direction in which a cross section of the second seal 60 extends. In other words, the opening 60*a* extends in a direction in which the second seal 60 extends. The opening 60*a* is recessed from the outer circumference of the second seal 60 in a sectional view.

As shown in FIG. 5, the opening ends 64 are ends of the opening 60*a* in a sectional view. The two opening ends 64 of each annular portion 67 are arranged in the axial direction of the first seal 50. The two opening ends 64 of each bridge 68 are arranged in the circumferential direction of the first seal 50.

The folded end 66 is an end folded in a V shape in a sectional view.

The second seal 60 is attached to the first seal 50 with the folded end 66 in contact with the groove bottom 54*a*. A clearance S1 is defined between the second seal 60 and each groove wall 54*b*. In other words, the groove 54 has the clearance S1 between each bend 62 of the second seal 60 and the groove 54.

The second seal 60 attached to the groove 54 generates a force on the first seal 50. The force is applied from the inner circumferential surface 51*a* of the first seal 50 to the rotor 30 toward the axis.

The second seal 60 attached to the groove 54 has the opening ends 64 protruding from the outer circumferential surface 51*b* of the first seal 50 in the radial direction. The second seal 60 attached to the groove 54 is to be in contact with the housing 20 with the opening ends 64 fittable with the inner circumferential surface 20*b* of the housing 20 during assembly. Each opening end 64 is an example of an outer end. The housing 20 presses the second seal 60 against the groove bottom 54*a* to seal the gap between the first seal 50 and the housing 20.

The second seals 60 surround the ports 51*p* in the first seal 50 with the annular portions 67 and the bridges 68 as viewed in the radial direction. The annular portions 67 reduce leakage of the fluid in the axial direction, which flows between the ports 51*p* in the first seal 50 and the port holes 20*p* in the housing 20. The bridges 68 reduce leakage of the fluid between the adjacent ports 51*p* or the adjacent port holes 20*p*.

The force applied from the first seal 50 to the rotor 30 toward the axis increases as the housing 20 presses the second seal 60 against the groove bottom 54*a*.

The bends 62 of the second seal 60 extend from the two opening ends 64 to the folded end 66. In other words, the bends 62 include the opening ends 64.

The bends 62 are bent in a direction intersecting with the radial direction of the first seal 50 when assembled with the housing 20. More specifically, the bends 62 are bendable in the direction intersecting with the radial direction of the first seal 50 during assembly. In other words, the second seal 60 is bendable in the direction intersecting with the radial direction of the first seal 50 during assembly.

The second seal 60 has a space 60*b* between the two opening ends 64. The space 60*b* is adjacent to the bends 62 in a sectional view. The space 60*b* is closer to the center of the second seal 60 than the bends 62 in a sectional view.

The bends 62 may bend with elastic deformation in the axial direction. The bends 62 may also bend with volume compression of the elastomer.

The structure of the second seal 60 that can bend when assembled with the housing 20 will be described in detail below with a method for assembling the sealing structure 10.

Method for Assembling Sealing Structure 10

An example method for assembling the sealing structure 10 will now be described.

The first seal 50 is assembled on the rotor 30. The second seals 60 are then attached to the grooves 54 on the first seal 50 assembled on the rotor 30. The sealing device 40 is thus assembled on the rotor 30.

Figure 6A:
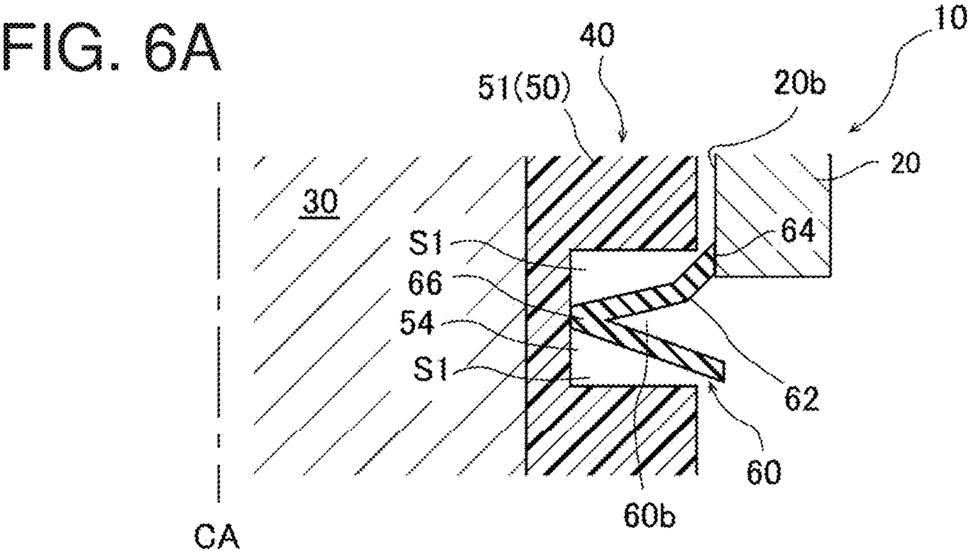
FIG. 6A is an enlarged sectional view of a second seal in the first embodiment with one of opening ends in contact with the edge of a housing.
Figure 6B:
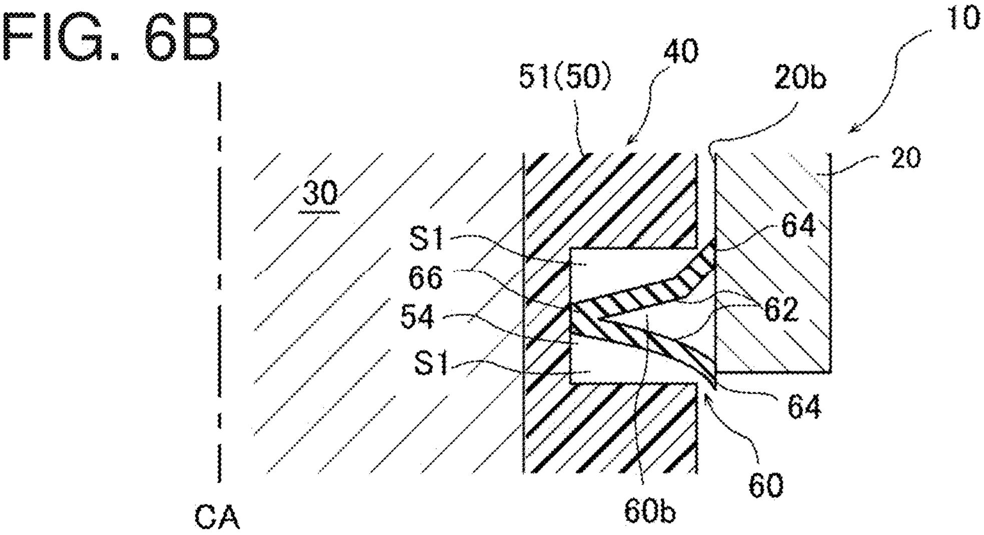
FIG. 6B is an enlarged sectional view of the second seal in the first embodiment with the other opening end in contact with the edge of the housing.
Figure 6C:
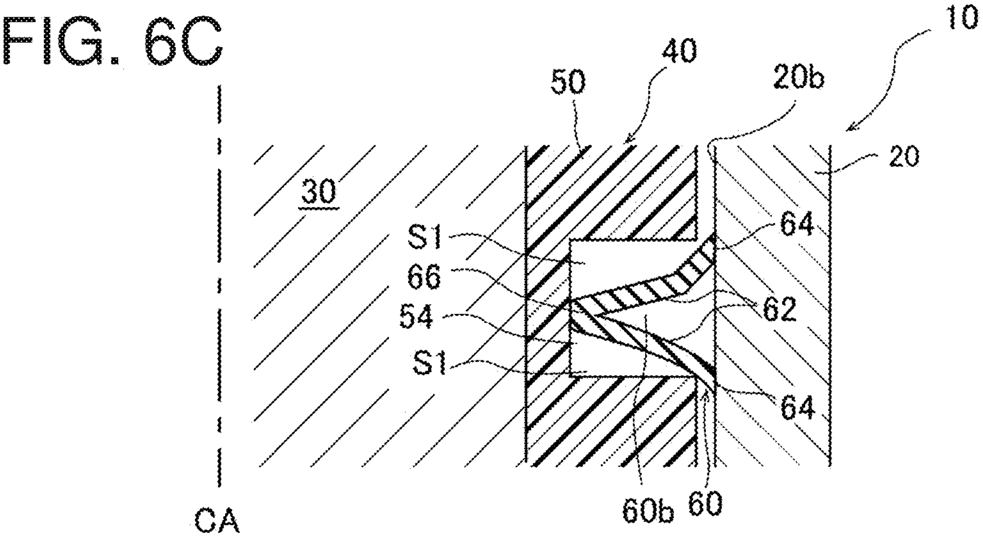
FIG. 6C is an enlarged sectional view of a sealing structure according to the first embodiment in an assembled state.

The housing 20 is then assembled on the sealing device 40 by being moved in the axial direction toward the sealing device 40 from outside (refer to FIGS. 6A to 6C). More specifically, the sealing device 40 is assembled with the relative movement of the housing 20 in the axial direction from outside to inside.

As shown in FIG. 6A, a first opening end 64 adjacent to the housing 20 first comes in contact with the edge of the housing 20. The bend 62 including the first opening end 64 receives the moment in the moving direction of the housing 20 in a sectional view. The housing 20 applies a fitting force on the second seal 60 attached to the groove 54 to press the second seal 60 toward the groove bottom 54*a*. The bend 62 including the first opening end 64 is bent in the direction intersecting with the radial direction of the first seal 50. The bend 62 including the first opening end 64 is bent to narrow the opening 60*a*.

As shown in FIGS. 6B and 6C, the housing 20 is then further moved relative to the sealing device 40, causing a second opening end 64 to come in contact with the housing 20. The housing 20 further applies a fitting force on the second seal 60 attached to the groove 54 toward the groove bottom 54*a*. The bend 62 including the second opening end 64 is bent in the direction intersecting with the radial direction of the first seal 50.

The advantageous effects of the sealing device 40, the sealing structure 10, and the method for assembling the sealing structure 10 will now be described. A sealing structure 10H as a comparative example of the first embodiment will be described with reference to FIGS. 7A and 7B. Like reference numerals and names of the components of the sealing structure 10 according to the first embodiment are used for like components of the sealing structure 10H.

Figure 7A:
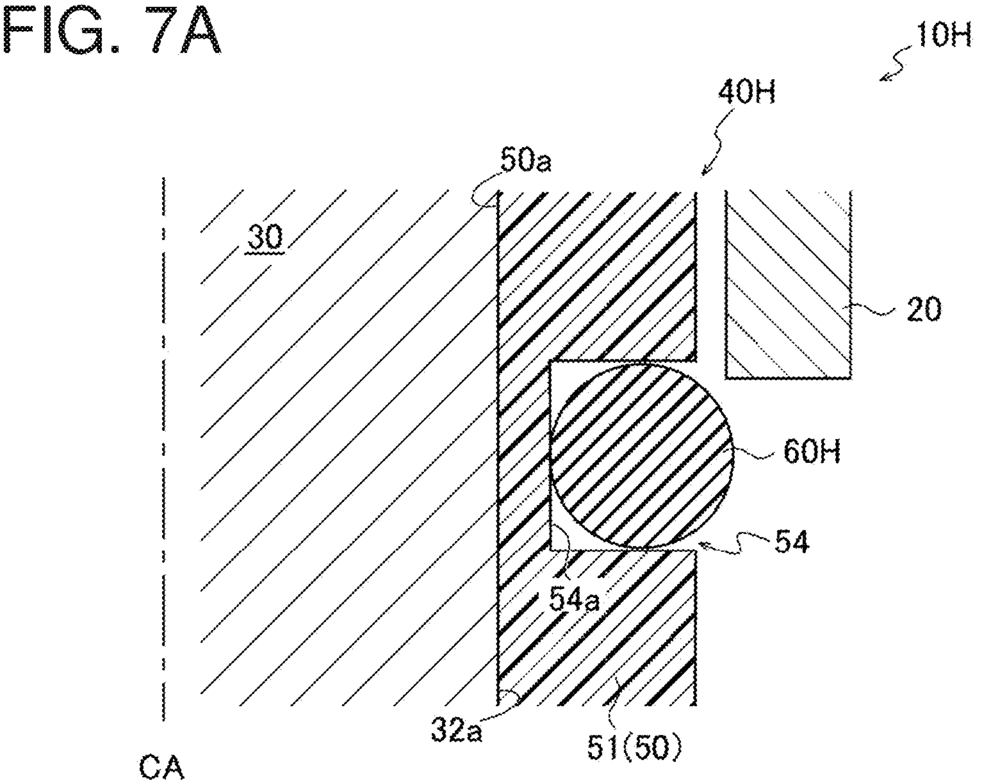
FIG. 7A is an enlarged sectional view of a second seal that is out of contact with the housing in a comparative example.
Figure 7B:
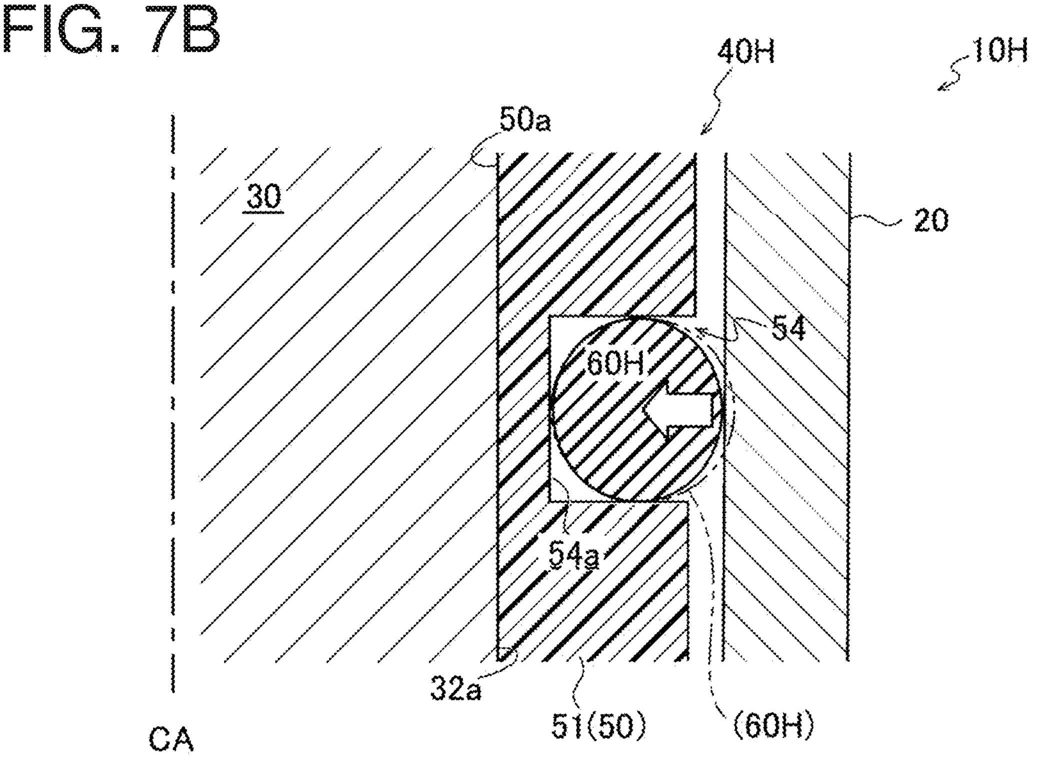
FIG. 7B is an enlarged sectional view of a sealing structure in an assembled state in the comparative example.

As shown in FIGS. 7A and 7B, the sealing structure 10H in the comparative example includes a sealing device 40H in place of the sealing device 40 according to the first embodiment. As shown in FIGS. 7A and 7B, the sealing device 40H includes a second seal 60H in place of the second seal 60. As shown in FIG. 7A, the second seal 60H has a solid circular cross section. More specifically, the second seal 60H in the comparative example does not include the opening 60*a*, the bends 62, or the opening ends 64. The second seal 60H in the comparative example is not bendable during assembly. The second seal 60H attached to the first seal 50 protrudes from the outer circumferential surface 51*b* in the radial direction by the same length as the second seal 60 in the first embodiment. The other components of the sealing structure 10H in the comparative example are the same as those of the sealing structure 10.

During assembly, the second seal 60H in the comparative example that is attached to the groove 54 elastically deforms and is compressed under the fitting force applied from the housing 20 toward the groove bottom 54*a*. The second seal 60H attached to the first seal 50 generates a reaction force in response to the fitting force. The reaction force generated by the second seal 60H is an elastic force from the elastomer. The reaction force (elastic force) from the second seal 60H is transmitted to the first seal 50 in the radial direction toward the central axis CA in the same manner as the fitting force. The reaction force (elastic force) in the radial direction toward the central axis CA is transmitted to the first seal 50 to increase the force applied from the first seal 50 to the rotor 30 toward the axis. When the force applied from the first seal 50 to the rotor 30 increases, a frictional force between the first seal 50 and the rotor 30 increases. In this case, the first seal 50 is less slidable on the rotor 30, and the sealing structure 10H may also be assembled less easily.

When the second seal 60H generates a greater reaction force in response to the fitting force applied from the housing 20, the frictional force between the second seal 60H and the housing 20 increases, causing the sealing structure 10H to be assembled less easily.

Figure 8:
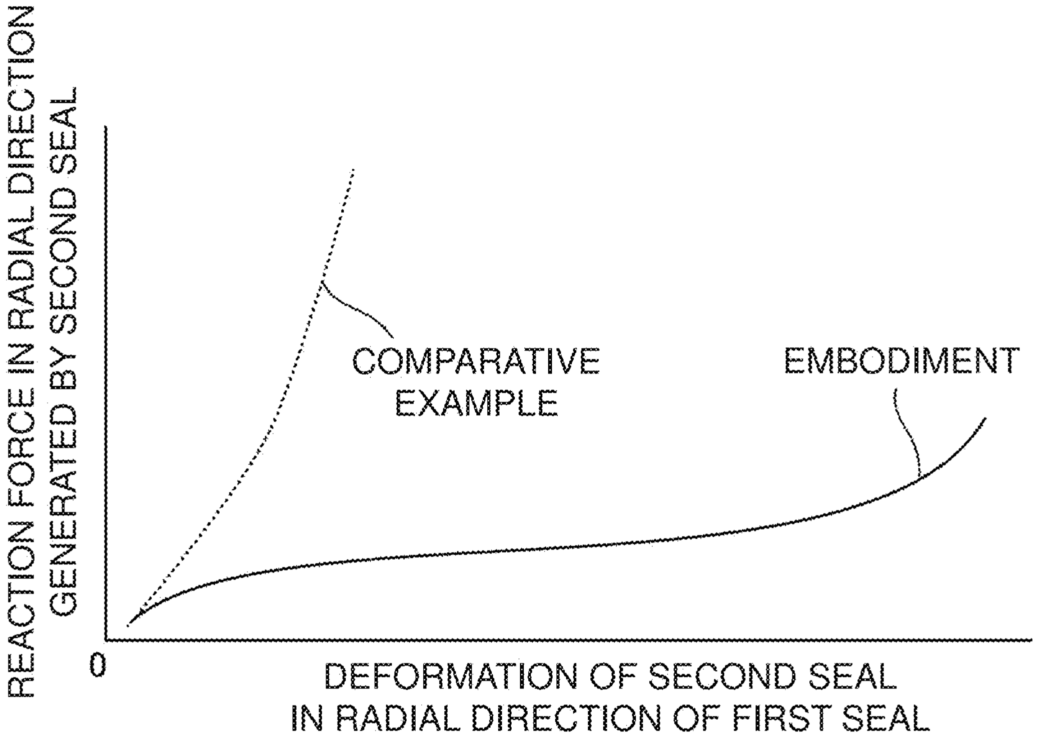
FIG. 8 is a graph showing the relationship between deformation and reaction force of the seals when the sealing structure according to the first embodiment is assembled.

The sealing device 40 includes the bends 62 that are bendable in the direction intersecting with the radial direction of the first seal 50 during assembly. In other words, the sealing device 40 includes the second seals 60 that are each bendable in the direction intersecting with the radial direction of the first seal 50 during assembly. In the second seal 60 attached to the first seal 50, the fitting force applied from the housing 20 is partially used for the bends 62 to bend when the sealing structure 10 is assembled. Thus, the reaction force (elastic force) generated by the second seal 60H in response to the fitting force applied from the housing 20 during assembling the sealing structure 10 is smaller than the reaction force generated during assembling the sealing structure 10H in the comparative example (refer to FIG. 8). The sealing device 40 including the second seals 60 can thus reduce the reaction force (elastic force) in the radial direction transmitted from the second seal 60 to the first seal 50 during assembly.

The sealing structure 10 including the sealing device 40 has a smaller reaction force (elastic force) in the radial direction transmitted from the second seals 60 to the first seal 50, and thus causes a smaller frictional force between the first seal 50 and the rotor 30 than the sealing structure 10H. Thus, the sealing structure 10 is assembled more easily. With the sealing structure 10, the frictional force between the first seal 50 and the rotor 30 is smaller, improving the slidability of the rotor 30. More specifically, with the sealing structure 10, when the housing 20 is assembled after the sealing device 40 is assembled on the rotor 30, the rotor 30 is less likely to have lower slidability during assembly.

The sealing structure 10 including the sealing device 40 has a smaller reaction force (elastic force) on the second seal 60H in response to the fitting force applied from the housing 20, and thus causes a smaller frictional force between the second seal 60H and the housing 20 than in the sealing structure 10H. Thus, the sealing structure 10 is assembled still more easily. More specifically, with the sealing structure 10, when the housing 20 is assembled after the sealing device 40 is assembled on the rotor 30, the housing 20 is assembled more easily.

The bends 62 include the opening ends 64 that come in contact with the housing 20 during assembly. The bends 62 are thus bendable under the moment applied in response to the relative movement of the housing 20 in the axial direction from outside to inside during assembly. Thus, the sealing device 40 allows the second seals 60 to be bent more easily under the fitting force applied from the housing 20 during assembly.

Each second seal 60 in the sealing device 40 has the opening 60*a*. In this case, the second seal 60 has a smaller section modulus, and thus bend more easily. Thus, the sealing device 40 allows the second seals 60 to be bent more easily during assembly.

Figure 17A:
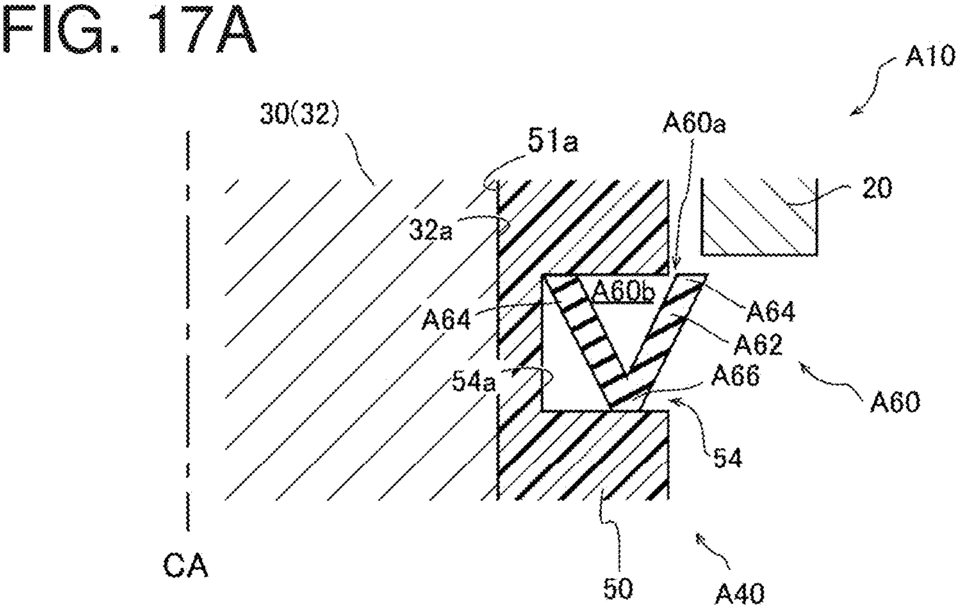
FIG. 17A is an enlarged sectional view of a second that is seal out of contact with the housing in another comparative example.
Figure 17B:
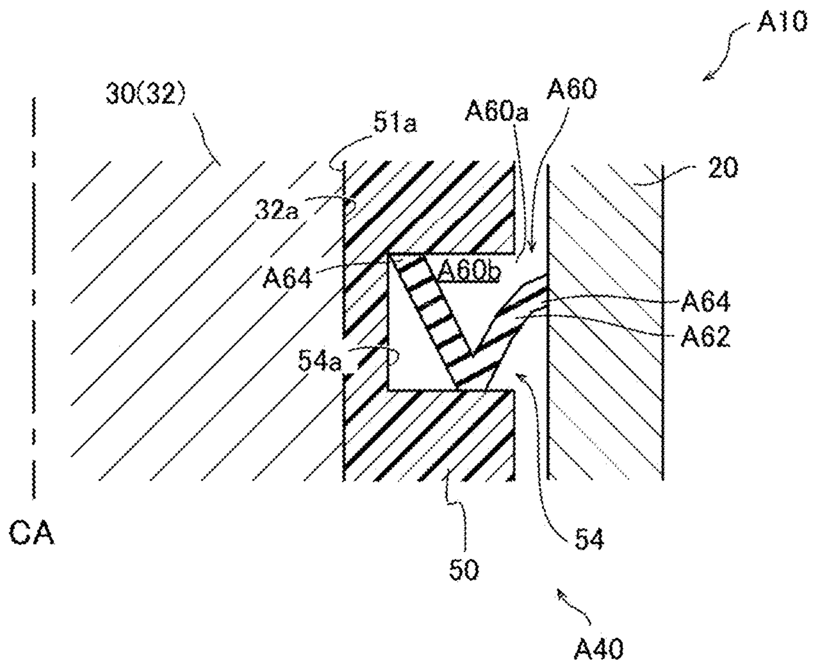
FIG. 17B is an enlarged sectional view of a sealing structure in an assembled state in the other comparative example.

The bends 62 in the sealing device 40 are bendable to narrow the opening 60*a* during assembly. A sealing device A40 shown in FIGS. 17A and 17B will be described as a comparative example of the sealing device 40 including the bends 62 that are bendable to narrow the opening 60*a* during assembly. As shown in FIG. 17A, the sealing device A40 includes a second seal A60 in place of the second seal 60 in the sealing device 40. The second seal A60 has a V-shaped cross section that is open in the axial direction of the first seal 50. The second seal A60 has an opening A60*a* and opening ends A64. When the housing 20 is moved from a position adjacent to the opening A60*a* relative to the second seal A60 during assembly of the sealing device A40, one of the opening ends A64 adjacent to the housing 20 comes in contact with the housing 20. As shown in FIG. 17B, the opening end A64 adjacent to the housing 20 deforms in the moving direction of the housing 20. The second seal A60 deforms to widen the opening A60*a*. With the second seal A60 deforming to widen the opening A60*a* when the housing 20 is assembled, the second seal A60 may be inverted toward the opening A60*a*. When the second seal A60 is inverted toward the opening A60*a*, the sealing performance of the second seal A60 may be lowered.

As shown in FIGS. 6A to 6C, the second seal 60 includes the bends 62 that are bendable to narrow the opening 60*a* during assembly and is thus less likely to be inverted toward the opening 60*a*. Thus, the sealing device 40 can reduce the inversion of the second seal 60 during assembly.

The second seal 60 in the sealing device 40 has a V-shaped cross section. In this case, the second seal 60 is likely to bend in a portion extending from the opening ends 64 to the folded end 66. Thus, the sealing device 40 allows a portion bendable during assembly to be identified easily.

The opening 60*a* of the second seal 60 is open toward the housing 20. In other words, the two opening ends 64 of the second seal 60 come in contact with the housing 20. When the opening of the second seal with the V-shaped cross section is open toward the rotor 30, the second seal comes in contact with the housing 20 with one folded end. The sealing performance to seal the gap between the second seal and the housing 20 increases when a larger surface of the second seal comes in contact with the housing 20. Thus, the sealing device 40 has higher sealing performance between the second seal 60 and the housing 20 than when having the structure with the opening being open toward the rotor 30.

The second seal 60 in the sealing device 40 has the opening ends 64 arranged in the axial direction. When the two opening ends are at different positions in the radial direction, the frictional force between one of the opening ends and the housing 20 is greater than the frictional force between the other opening end and the housing 20 by the degree of the difference, causing the sealing device to be assembled less easily. When arranged in the axial direction, the two opening ends 64 have a smaller difference in position in the radial direction. Thus, the sealing device 40 has a smaller difference in the frictional forces between the respective opening ends 64 and the housing 20 during assembly. Thus, the sealing device 40 is assembled more easily than when having the structure in which the two opening ends 64 are at different positions in the radial direction.

The clearance S1 is defined between the groove 54 and each bend 62 in the sealing device 40. Thus, the bends 62 are bendable toward the clearance S1 in a sectional view. Thus, the sealing device 40 allows the second seals 60 to be bent toward the clearance S1 during assembly.

The second seal 60 further has the space 60*b* defined adjacent to the bends 62 in a sectional view. The space 60*b* is closer to the center of the second seal 60 than the bends 62 in a sectional view. Thus, the bends 62 are bendable toward the space 60*b* in a sectional view. Thus, the sealing device 40 allows the second seal 60 to be bent toward the space 60*b* during assembly.

The sealing structure 10 may be assembled by assembling the rotor 30 on the inner circumferential surface 51*a* of the sealing device 40 after the sealing device 40 is assembled on the housing 20. In this case, the reaction force (elastic force) in the radial direction transmitted from the second seal 60 to the first seal 50 is reduced. Thus, the force applied from the first seal 50 toward the axis is less likely to increase than in the sealing structure 10H in the comparative example when the housing 20 is assembled. More specifically, when the rotor 30 is assembled in this case, the frictional force generated between the first seal 50 and the rotor 30 is smaller than in the sealing structure 10H in the comparative example. Thus, with the sealing structure 10, when the rotor 30 is assembled on the inner circumferential surface 51*a* of the sealing device 40 after the sealing device 40 is assembled on the housing 20, the rotor 30 is assembled more easily.

(2) Second Embodiment

A sealing structure 210 according to a second embodiment will now be described with reference to the drawings. Like reference numerals and names of the components according to the above embodiment are used for like components in the present embodiment. The same structure as in the above embodiment will not be described below.

Figure 9:
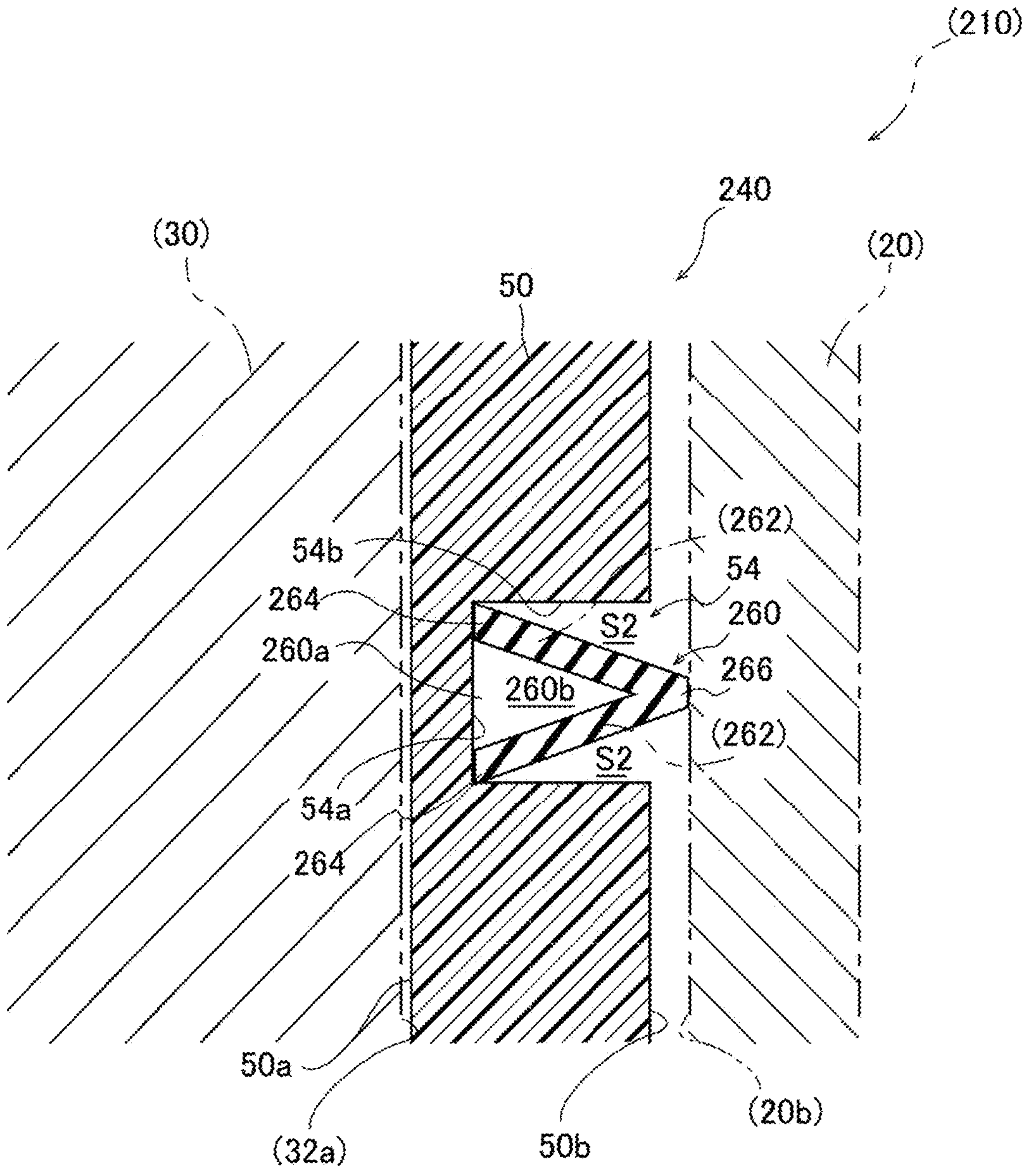
FIG. 9 is an enlarged sectional view of a sealing device according to a second embodiment.

As shown in FIG. 9, the sealing structure 210 includes a sealing device 240 in place of the sealing device 40 according to the first embodiment.

The sealing device 240 includes second seals 260 in place of the second seals 60 in the first embodiment.

Second Seal 260

As shown in FIG. 9, each second seal 260 has a V-shaped cross section. The second seal 260 has a thickness in a V-shaped cross section. The second seal 260 is open toward the rotor 30 in a sectional view. In other words, the second seal 260 has an opening 260*a*. The opening 260*a* is open toward the rotor 30. The second seal 260 has two opening ends 264 and a folded end 266 in a sectional view. The second seal 260 includes bends 262.

The second seal 260 is attached to the first seal 50 with the two opening ends 264 in contact with the groove bottom 54*a* of the groove 54. A clearance S2 is defined between the second seal 260 and each groove wall 54*b*. In other words, the clearance S2 is defined between each bend 262 and the groove 54.

The second seal 260 attached to the groove 54 has the folded end 266 in contact with the housing 20. The folded end 266 is an example of the outer end. The bends 262 include the folded end 266.

The second seal 260 has a space 260*b* between the two opening ends 264. The space 260*b* is adjacent to the bends 262 in a sectional view. The space 260*b* is closer to the center of the second seal 260 than the bends 262 in a sectional view.

Method for Assembling Sealing Structure 210

An example method for assembling the sealing structure 210 will now be described.

The first seal 50 is assembled on the rotor 30. The second seals 260 are then attached to the grooves 54 on the first seal 50 assembled on the rotor 30. More specifically, the sealing device 240 is assembled on the rotor 30.

Figures 10A, 10B, 10C:
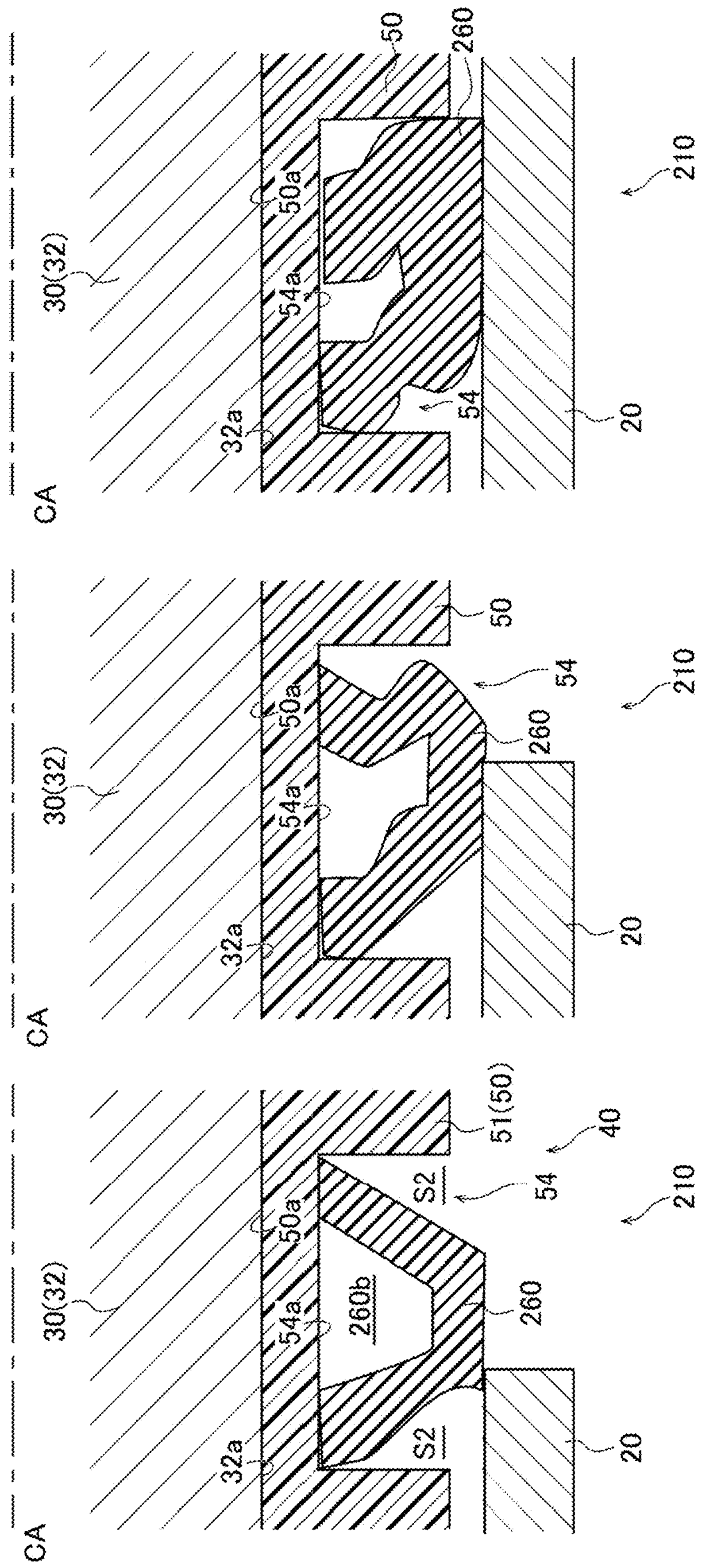
FIG. 10A is an enlarged sectional view of a housing being fitted relatively to a sealing structure according to the second embodiment and starting to come in contact with a folded end of a second seal.
FIG. 10B is an enlarged sectional view of the housing being further fitted relatively from the position in FIG. 10A.
FIG. 10C is an enlarged sectional view of the sealing structure according to the second embodiment in an assembled state.

The housing 20 is then assembled on the sealing device 240 by being moved relatively in the axial direction toward the sealing device 240 from outside (refer to FIGS. 10A to 10C).

As shown in FIG. 10A, the folded end 266 first comes in contact with the edge of the housing 20. The bends 262 including the folded end 266 receives the moment in the moving direction of the housing 20 in a sectional view. The housing 20 applies a fitting force on the second seal 260 attached to the groove 54 toward the groove bottom 54*a*. In this state, a first one of the bends 262 adjacent to the housing 20 in the axial direction with respect to the second seal 260 is bent.

As shown in FIGS. 10B and 10C, the housing 20 is then moved further relative to the sealing device 240, causing the fitting force applied to the second seal 260 to increase. In this state, the other bend 262 opposite to the first bend 262 across the opening 260*a* is bent.

The other components of the sealing structure 210 are the same as those of the sealing structure 10.

The advantageous effects of the second embodiment will now be described.

The opening 260*a* of the second seal 260 is open toward the rotor 30. In other words, one folded end 266 of the second seal 260 comes in contact with the housing 20. Thus, the frictional force generated between the second seal 260 and the housing 20 during assembly is smaller than when the opening is open toward the housing 20. Thus, the sealing device 240 is assembled more easily than a sealing device in which the opening is open toward the housing 20.

(3) Third Embodiment

A sealing structure 310 according to a third embodiment will now be described with reference to the drawings. Like reference numerals and names of the components according to the above embodiments are used for like components in the present embodiment. The same structure as in the above embodiments will not be described below.

Figure 11:
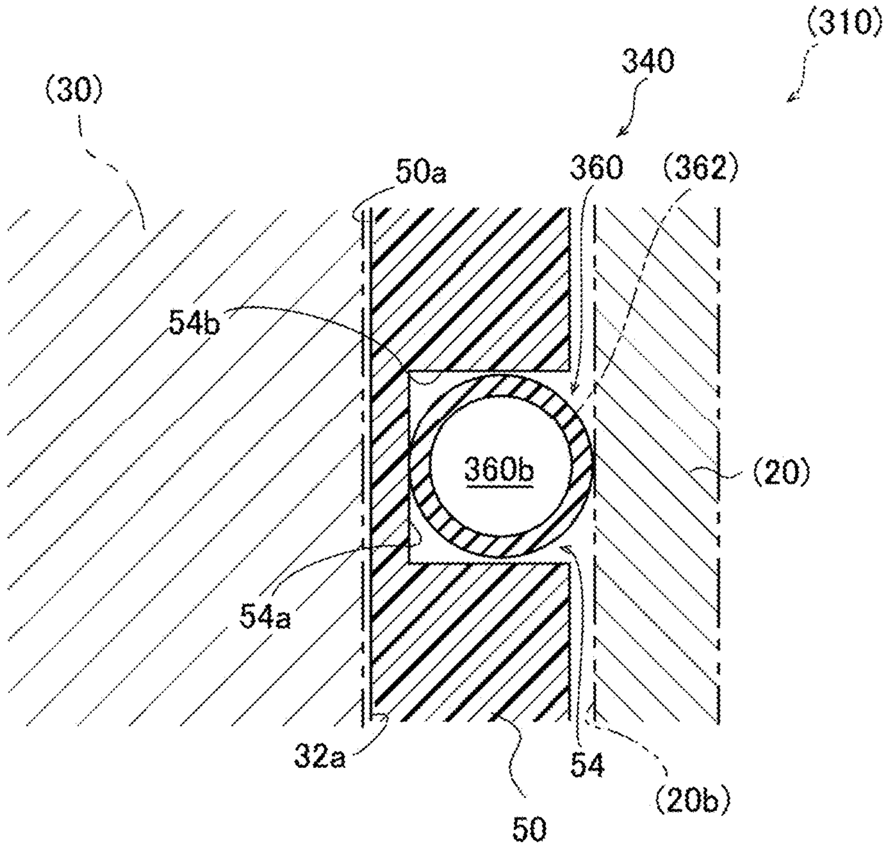
FIG. 11 is an enlarged sectional view of a sealing device according to a third embodiment.

As shown in FIG. 11, the sealing structure 310 includes a sealing device 340 in place of the sealing device 40 according to the first embodiment.

The sealing device 340 includes second seals 360 in place of the second seals 60 in the first embodiment.

Second Seal 360

As shown in FIG. 11, each second seal 360 has a hollow annular cross section. The second seal 360 has a thickness in an annular cross section. The second seal 360 has an outer edge. The second seal 360 includes a bend 362. The second seal 360 has no opening in a sectional view. The second seal 360 has a space 360*b* inside in an annular cross section. The space 360*b* is adjacent to the bend 362 in a sectional view. The space 360*b* is closer to the center of the second seal 360 than the bend 362 in a sectional view.

The other components of the sealing structure 310 are the same as those of the sealing structure 10.

The sealing structure 310 and the sealing device 340 produce the same advantageous effects as the sealing structure 10 and the sealing device 40, except the advantageous effects produced by the opening.

(4) Fourth Embodiment

A sealing structure 410 according to a fourth embodiment will now be described with reference to the drawings. Like reference numerals and names of the components according to the above embodiments are used for like components in the present embodiment. The same structure as in the above embodiments will not be described below.

Figure 12:
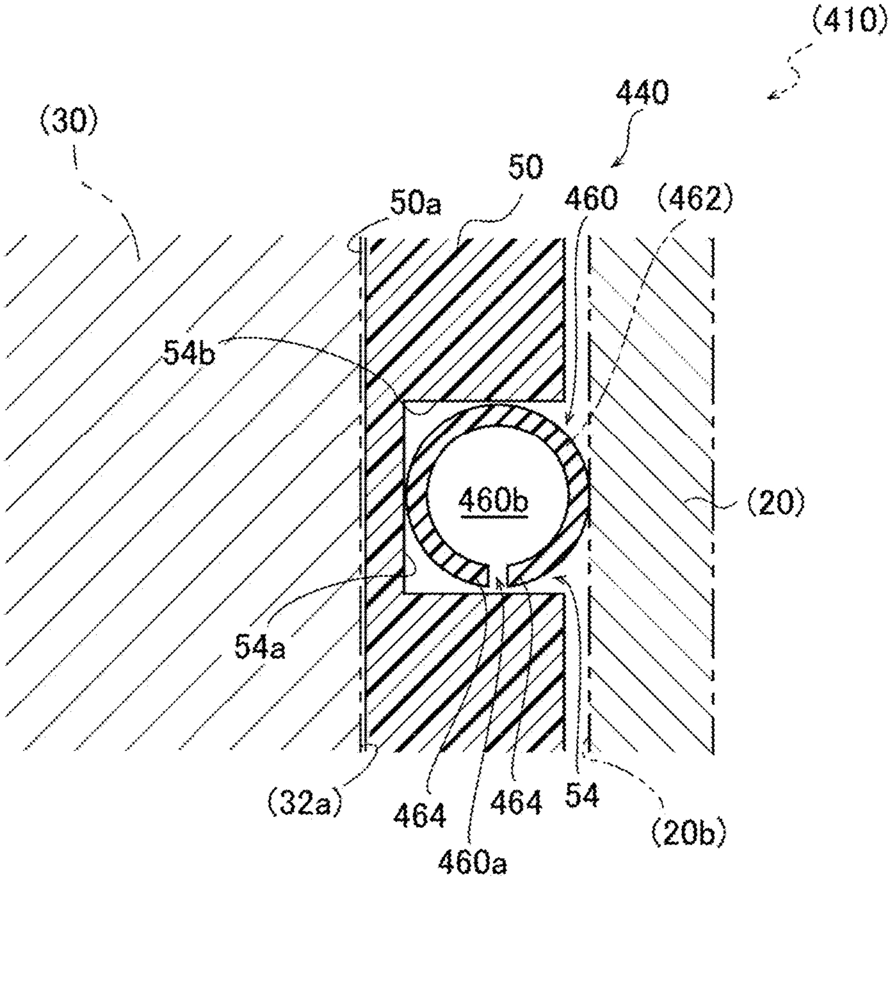
FIG. 12 is an enlarged sectional view of a sealing device according to a fourth embodiment.

As shown in FIG. 12, the sealing structure 410 includes a sealing device 440 in place of the sealing device 40 according to the first embodiment.

The sealing device 440 includes second seals 460 in place of the second seals 60 in the first embodiment.

Second Seal 460

As shown in FIG. 12, each second seal 460 has a C-shaped cross section. The second seal 460 has a thickness in a C-shaped cross section. The second seal 460 has an opening 460*a*. The opening 460*a* is open toward a groove wall 54*b* in a sectional view. The second seal 460 has two opening ends 464 in a sectional view. The second seal 460 includes a bend 462. The second seal 460 has an outer edge. The second seal 460 has a space 460*b* inside in a C-shaped cross section. The space 460*b* is adjacent to the bend 462 in a sectional view. The space 460*b* is closer to the center of the second seal 460 than the bend 462 in a sectional view.

The other components of the sealing structure 410 are the same as those of the sealing structure 10.

The sealing structure 410 and the sealing device 440 produce the same advantageous effects as the sealing structure 210 and the sealing device 240.

(5) Fifth Embodiment

A sealing structure 510 according to a fifth embodiment will now be described with reference to the drawings. Like reference numerals and names of the components according to the above embodiments are used for like components in the present embodiment. The same structure as in the above embodiments will not be described below.

Figure 13:
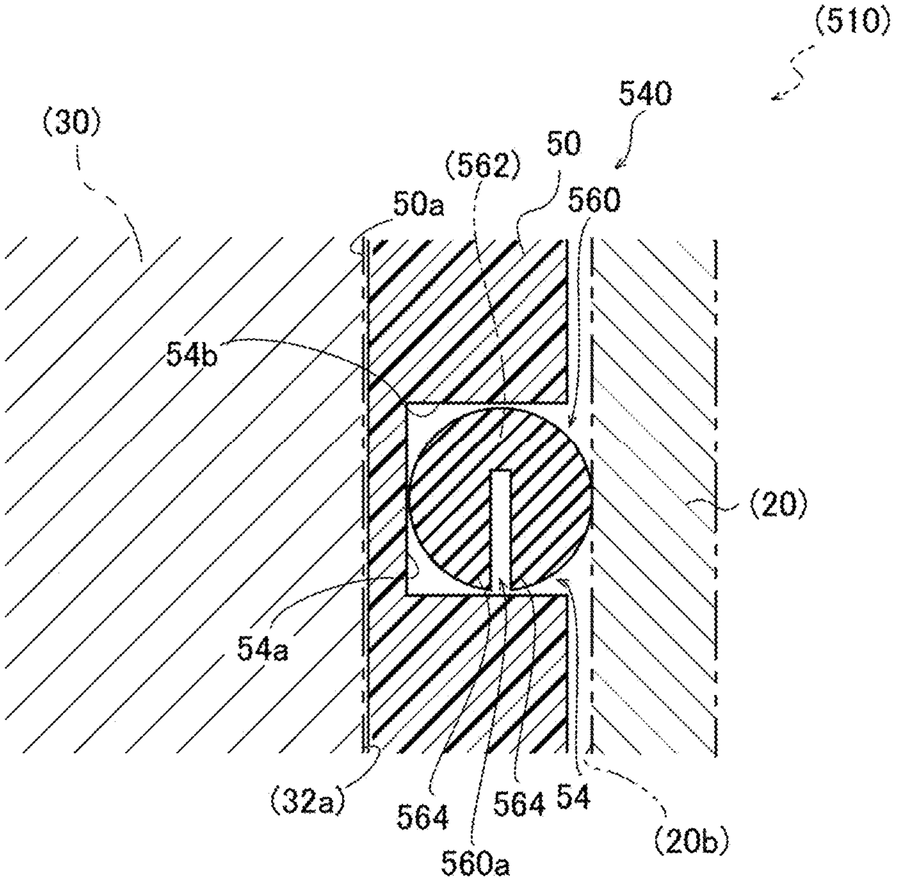
FIG. 13 is an enlarged sectional view of a sealing device according to a fifth embodiment.

As shown in FIG. 13, the sealing structure 510 includes a sealing device 540 in place of the sealing device 40 according to the first embodiment.

The sealing device 540 includes second seals 560 in place of the second seals 60 in the first embodiment.

Second Seal 560

As shown in FIG. 13, each second seal 560 has a substantially solid circular cross section. The second seal 560 has an opening 560*a* recessed from the outer circumference of the second seal 560 in a sectional view. The opening 560*a* is a slit extending from the outer circumference of the second seal 560 toward the sectional center in a cross section. The opening 560*a* is open toward a groove wall 54*b* in a sectional view. The second seal 560 has two opening ends 564 in a sectional view. The second seal 560 includes a bend 562. The bend 562 includes a portion with the shortest distance between the bottom of the opening 560*a* and an outer circumferential portion of the second seal 560 in a sectional view. The second seal 560 has an outer edge.

The other components of the sealing structure 510 are the same as those of the sealing structure 10.

The sealing structure 510 and the sealing device 540 produce the same advantageous effects as the sealing structure 210 and the sealing device 240.

(6) Sixth Embodiment

A sealing structure 610 according to a sixth embodiment of the disclosure will now be described with reference to the drawings. Like reference numerals and names of the components according to the above embodiments are used for like components in the present embodiment. The same structure as in the above embodiments will not be described below.

Figure 14:
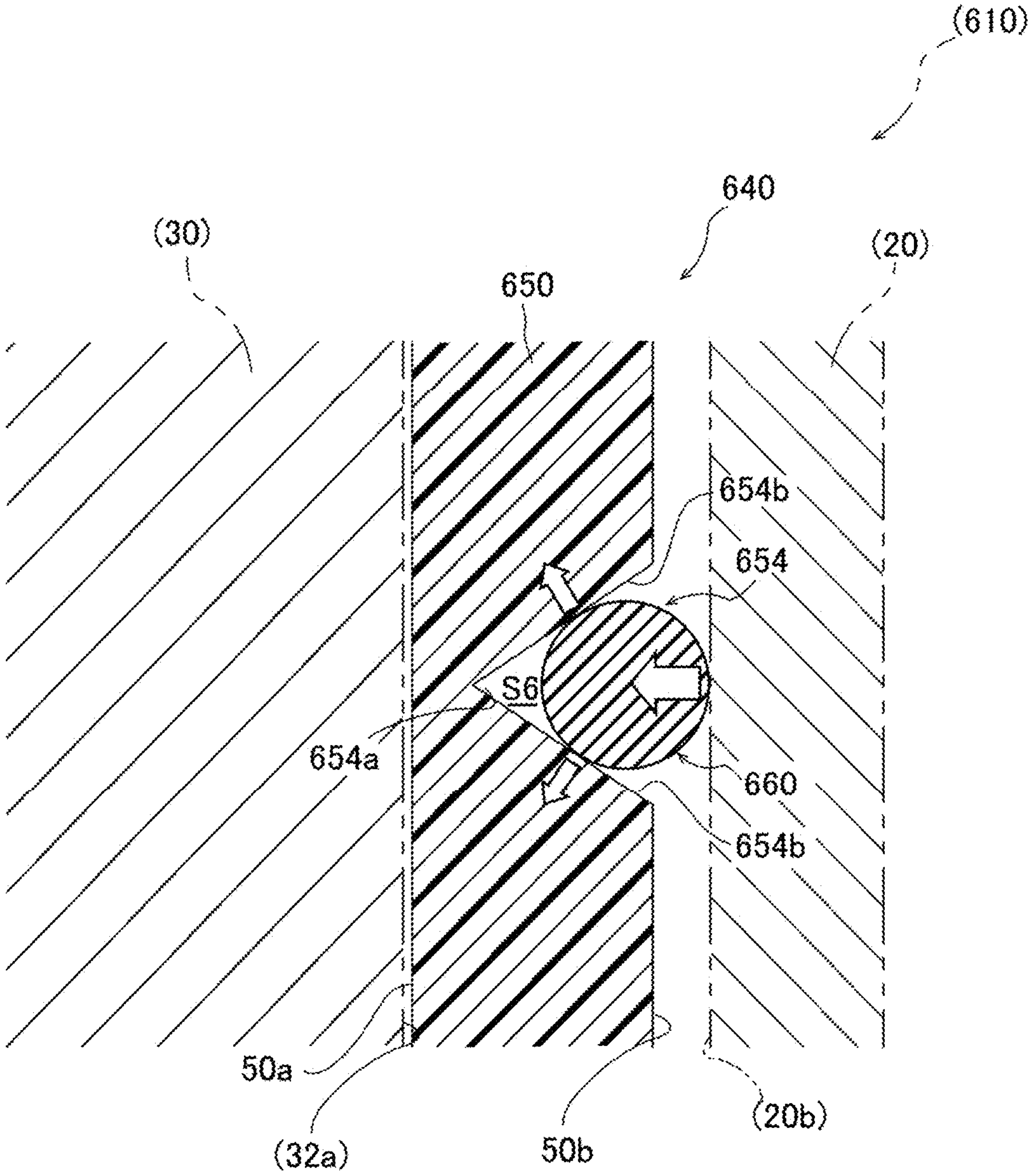
FIG. 14 is an enlarged sectional view of a sealing device according to a sixth embodiment.

As shown in FIG. 14, the sealing structure 610 includes a sealing device 640 in place of the sealing device 40 according to the first embodiment.

The sealing device 640 includes a first seal 650 and second seals 660.

First Seal 650

The first seal 650 has a groove 654 in place of the groove 54 in the first embodiment. As shown in FIG. 14, the groove 654 is V-shaped in a sectional view. The groove 654 has a bottom end 654*a* and a pair of slopes 654*b*. The bottom end 654*a* corresponds to the apex of the V shape in a sectional view. The pair of slopes 654*b* flare toward the housing 20. Each slope 654*b* extends straight in a direction intersecting with the radial direction in a sectional view. The pair of slopes 654*b* are symmetric with each other in the radial direction of the first seal 650.

Second Seal 660

As shown in FIG. 14, each second seal 660 has a substantially solid circular cross section. More specifically, the second seal 660 does not include the opening, the bend, or the opening end. The second seal 660 is not bendable during assembly. The second seal 660 is attached to the first seal 650 while coming in contact with the pair of slopes 654*b* of the groove 654.

When the second seal 660 is attached to the first seal 650 and is not assembled on the housing 20, a clearance S6 is defined between the second seal 660 and the bottom end 654*a*.

The other components of the sealing structure 610 are the same as those of the sealing structure 10.

The second seal 660 attached to the first seal 650 generates a reaction force (elastic force) in response to the fitting force applied from the housing 20 during assembly. The second seal 660 then comes in contact with the pair of slopes 654*b*. Thus, the reaction force (elastic force) generated by the second seal 660 is applied to the first seal 650 through the groove 654 in directions opposite to the normal directions of the pair of slopes 654*b*. Thus, the sealing structure 610 has, during assembly, a smaller reaction force (elastic force) in the radial direction transmitted from the second seal 660 to the first seal 650 than the sealing structure 10H in the comparative example. The sealing device 640 with the groove 654 can reduce a reaction force (elastic force) in the radial direction transmitted from the second seal 660 to the first seal 650 during assembly.

The sealing structure 610 including the sealing device 640 produces the same advantageous effects as the sealing structure 10.

The clearance S6 is defined between the bottom end 654*a* and the second seal 660 when the housing 20 is not assembled. The second seal 660 being pressed by the housing 20 during assembly deforms toward the clearance S6 with a behavior specific to an elastomer, causing the area of the clearance S6 to be smaller than when the second seal 660 is not pressed by the housing 20. More specifically, the second seal 660 is deformable toward the clearance S6 during assembly. In the second seal 60 attached to the first seal 650, the fitting force applied from the housing 20 is partially used for the second seal 60 to deform toward the clearance S6 during assembly. The sealing device 640 with the clearance S6 can reduce a reaction force (elastic force) in the radial direction generated by the second seal 60 while being pressed by the housing 20 during assembly.

The pair of slopes 654*b* are symmetric with each other in the radial direction of the first seal 650. The force generated between the pair of slopes 654*b* and the second seal 660 during assembly can be canceled by each other in the axial direction. The second seal 660 is thus less likely to be displaced from the groove 654 in the axial direction during assembly. Thus, the sealing device 640 is assembled more easily.

(6) Seventh Embodiment

A sealing structure 710 according to a seventh embodiment will now be described with reference to the drawings. Like reference numerals and names of the components according to the above embodiments are used for like components in the present embodiment. The same structure as in the above embodiments will not be described below.

Figure 15:
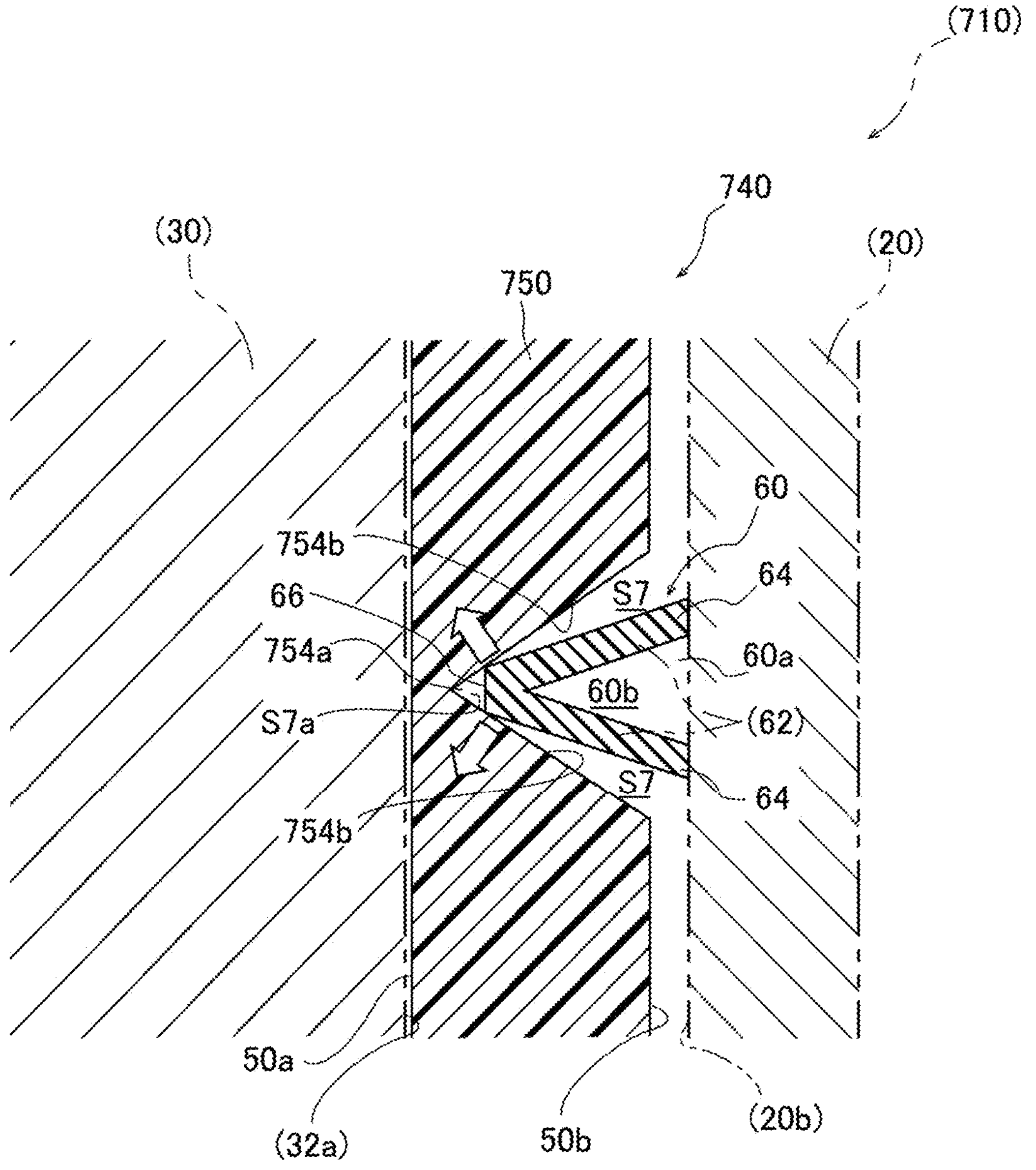
FIG. 15 is an enlarged sectional view of a sealing device according to a seventh embodiment.

As shown in FIG. 15, the sealing structure 710 includes a sealing device 740 in place of the sealing device 40 according to the first embodiment.

The sealing device 740 includes a first seal 750 in place of the first seal 50 in the first embodiment. The sealing device 740 includes the second seals 60 in the first embodiment. More specifically, each second seal 60 in the sealing device 740 includes the bends 62 that are bendable during assembly. The second seal 60 in the sealing device 740 has the folded end 66.

The sealing device 740 may instead include any of the second seals 260, 360, 460, and 560 in place of the second seals 60.

First Seal 750

The first seal 750 has a groove 754 in place of the groove 54 in the first embodiment. The groove 754 is the same as the groove 654 in the sixth embodiment. In other words, as shown in FIG. 15, the groove 754 is V-shaped in a sectional view. The groove 754 has a bottom end 754*a* and a pair of slopes 754*b*. The pair of slopes 754*b* flare toward the housing 20. Each slope 754*b* extends straight in a direction intersecting with the radial direction in a sectional view. The pair of slopes 754*b* are symmetric with each other in the radial direction of the first seal 750.

The second seal 60 is attached to the first seal 750 while coming in contact with the pair of slopes 754*b* of the groove 754.

The second seal 60 is attached to the first seal 750 with the folded end 66 in contact with the pair of slopes 754*b*. A clearance S7 is defined between each bend 62 and the corresponding one of the pair of slopes 754*b*.

When the second seal 60 is attached to the first seal 750 and is not assembled on the housing 20, a clearance S7*a* is defined between the second seal 60 and the bottom end 754*a*. In other words, the clearance S7*a* is defined between the bottom end 754*a* and the second seal 760 when the housing 20 is not assembled.

The other components of the sealing structure 610 are the same as those of the sealing structure 10.

Each second seal 60 in the sealing device 740 includes the bends 62 that are bendable during assembly. Thus, the sealing device 740 can further reduce deformation of the first seal 750 during assembly.

The clearance S7 is defined between the groove 754 and each bend 62 in the sealing device 740. Thus, the bends 62 are bendable toward the clearance S7. Thus, when the second seal 60 is attached to the groove 754 including the pair of slopes 754*b*, the sealing device 740 allows the second seal 60 to be bent toward the clearance S7 during assembly.

Although embodiments of the disclosure have been described, the disclosure is not limited to the embodiments described above, and may be modified, changed, or varied in various manners within the scope of technical idea of the disclosure.

As shown in FIGS. 5, 6A to 6C, 9, 10A to 10C, 12, 13, and 15, for example, the second seal has the opening that is open in the radial direction or the axial direction of the first seal. However, the second seal in one or more embodiments of the disclosure may have an opening that is inclined with respect to the radial direction, the axial direction, or both the directions of the first seal.

The groove 654 in the sixth embodiment and the groove 754 in the seventh embodiment are V-shaped in a sectional view. However, the groove having a pair of slopes in one or more embodiments of the disclosure may have a groove bottom that is between the pair of slopes and is parallel to the outer circumferential surface of the first seal.

Figure 16:
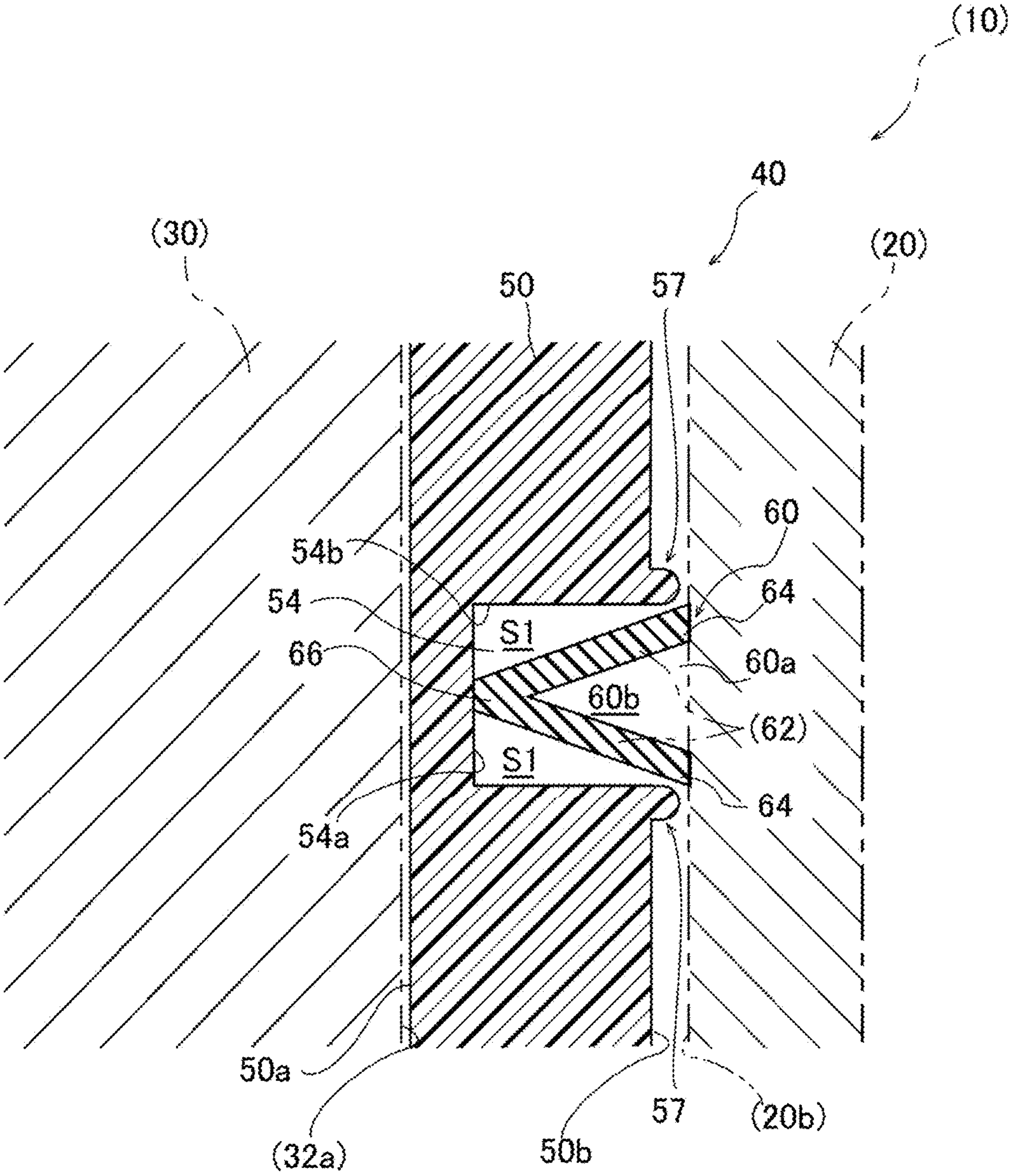
FIG. 16 is an enlarged sectional view of a sealing device according to a modification of the disclosure.

The first seal 50 in the first embodiment extends from the cylindrical outer circumferential surface 51*b* to the groove wall 54*b*. However, as shown in FIG. 16, the first seal 50 may include projections 57 surrounding the groove 54. The projections 57 are ribs along the groove 54. In other words, the first seal in one or more embodiments of the disclosure may include projections that are ribs surrounding the groove.

The second seal 60 in the first embodiment is bent to narrow the opening 60*a*. However, the second seal in the sealing device according to one or more embodiments of the disclosure may be bent to widen the opening. More specifically, the sealing device according to one or more embodiments of the disclosure may be the sealing device A40 described above (refer to FIGS. 17A and 17B).

Figure 18:
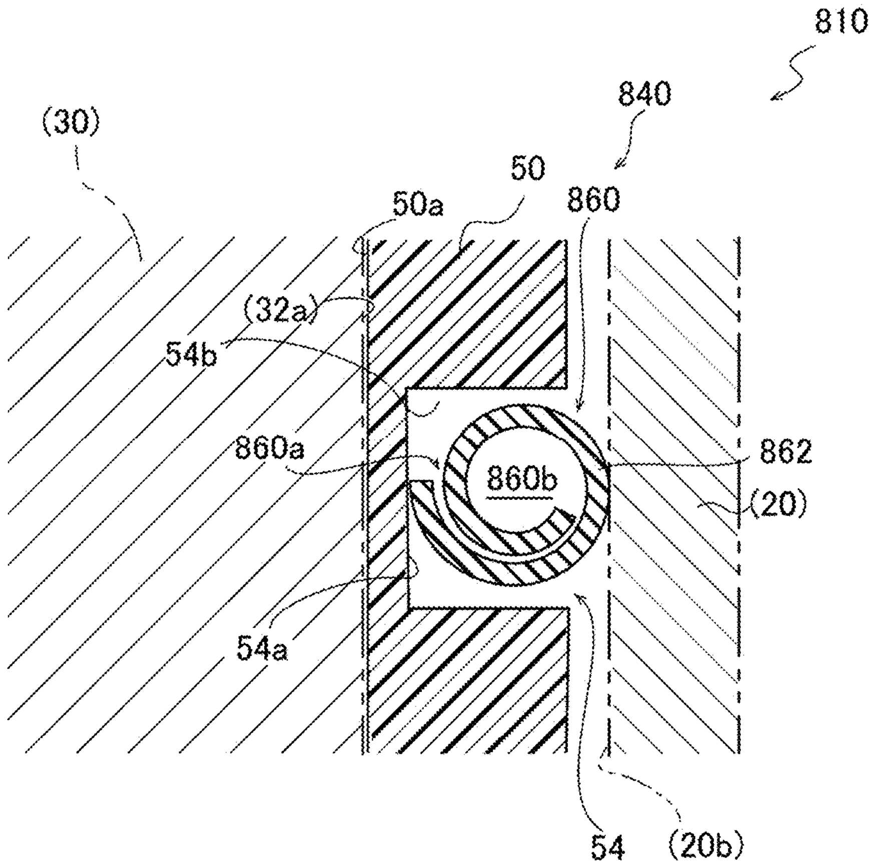
FIG. 18 is an enlarged sectional view of a sealing device according to a modification of the disclosure.

The second seal in one or more embodiments of the disclosure may be a second seal 860 with a spiral cross section as shown in FIG. 18. The second seal 860 includes a buckling portion 862, a space 860*a*, and an opening 860*b*.

Figure 19A:
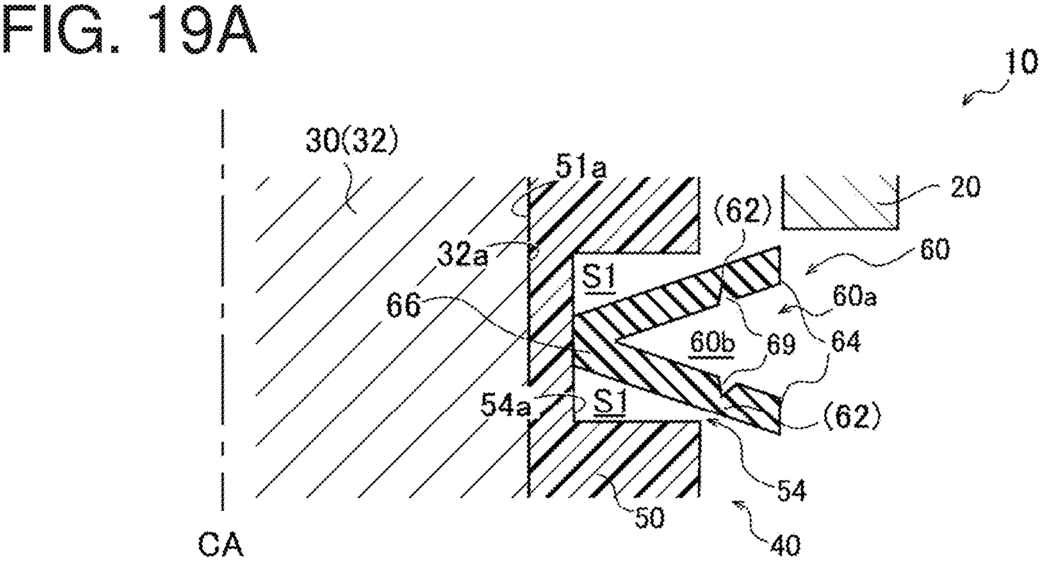
FIG. 19A is an enlarged sectional view of a second seal in a sealing device according to a modification of the disclosure that is out of contact with the housing.
Figure 19B:
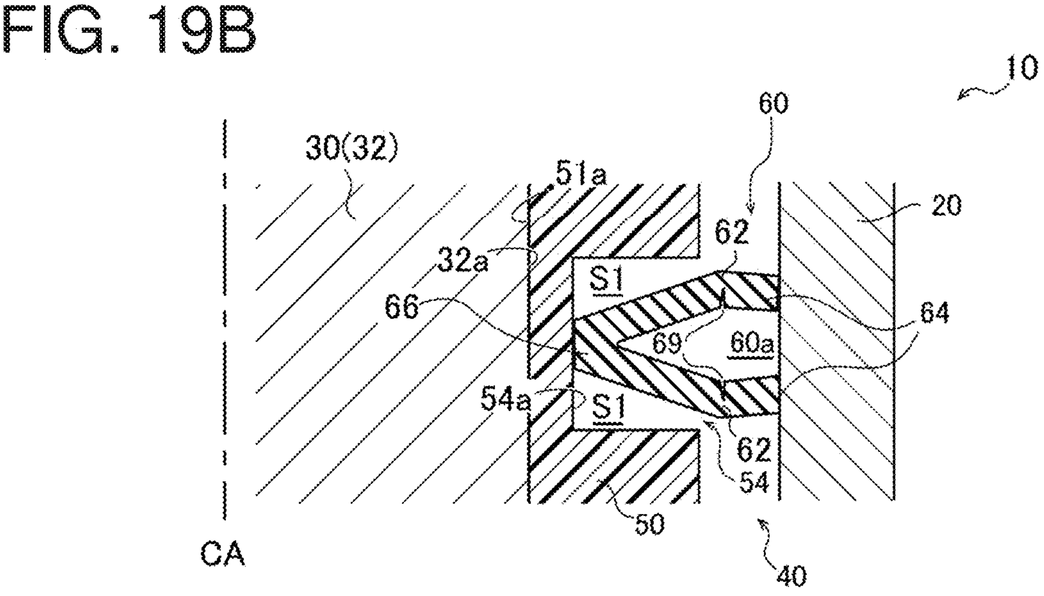
FIG. 19B is an enlarged sectional view of the sealing device according to the modification of the disclosure in an assembled state.

The second seal 60 in the first embodiment may have the opening ends 64 bendable toward the space 60*b* as shown in FIG. 19B. More specifically, as shown in FIG. 19A, the second seal 60 may have cutouts 69 each in a portion adjacent to the space 60*b* and extending from the folded end 66 to the corresponding opening end 64 in a sectional view. The second seal 60 may have folds in place of the cutouts 69. The cutouts 69 or the folds may extend in a direction in which a cross section of the second seal 60 extends. The cutouts 69 or the folds may extend straight in a direction intersecting with the direction in which a cross section of the second seal 60 extends.

The invention claimed is:

1. A sealing device to be assembled between a housing being cylindrical and a rotor located inside the housing coaxially with the housing and rotatable about an axis, the sealing device comprising:
- a first seal including a body to extend along an outer periphery of the rotor, the first seal including a port that extends radially outwardly relative to the axis throughout the body, and a groove on an outer circumferential surface of the body and surrounding the port when the outer circumferential surface is viewed in a radial direction toward the axis, the groove including a pair of slopes flaring toward the housing; and
- a second seal attachable to the groove to be in contact with the pair of slopes, the second seal being configured to seal a gap between the housing and the first seal,
- wherein the groove includes a pair of annular grooves, and side grooves that bridge between the pair of annular grooves; and
- wherein the port is between the annular grooves in the axial direction, and between the side grooves in the circumferential direction.

2. The sealing device according to claim 1, wherein
- the groove includes a bottom end,
- the groove has a first clearance between the bottom end and the second seal, and
- the second seal is deformable toward the first clearance during assembly.

3. The sealing device according to claim 2, wherein
- the second seal comprises an elastomer.

4. The sealing device according to claim 1, wherein
- the pair of slopes are symmetric with each other in a radial direction of the first seal.

5. The sealing device according to claim 1, wherein
- the second seal includes a buckling portion configured to buckle during assembly.

6. The sealing device according to claim 5, wherein
- the groove has a second clearance between the pair of slopes and the buckling portion.

7. A sealing device to be assembled between a housing being cylindrical and a rotor located inside the housing coaxially with the housing and rotatable about an axis, the sealing device comprising:
- a first seal including a body to extend along an outer periphery of the rotor, the first seal including a port that extends radially outwardly relative to the axis throughout the body, and a groove on an outer circumferential surface of the body and surrounding the port when the outer circumferential surface is viewed in a radial direction toward the axis, the groove including a pair of slopes and a bottom end, each of the pair of slopes extending straight in a direction intersecting with the radial direction in a sectional view; and a second seal attachable to the groove to be in contact with the pair of slopes, the second seal being configured to seal a gap between the housing and the first seal, wherein the groove includes a pair of annular grooves, and side grooves that bridge between the pair of annular grooves;

the port is between the annular grooves in the axial direction, and between the side grooves in the circumferential direction, the groove has a first clearance between the bottom end and the second seal, and the second seal is deformable toward the first clearance during assembly.

8. A sealing structure, comprising:

the sealing device according to claim 1;

the housing; and the rotor.

9. A method for assembling a sealing structure, the method comprising:

assembling the sealing device according to claim 1 on the housing being cylindrical; and assembling the rotor on an inner circumferential surface of the sealing device assembled on the housing, the inner circumferential surface being opposite to the outer circumferential surface.

10. A method for assembling a sealing structure, the method comprising:

assembling the sealing device according to claim 1 on the rotor; and assembling the housing on the sealing device assembled on the rotor.

11. The sealing device according to claim 2, wherein the pair of slopes are symmetric with each other in a radial direction of the first seal.

12. The sealing device according to claim 2, wherein the second seal includes a buckling portion configured to buckle during assembly.

13. The sealing device according to claim 3, wherein the second seal includes a buckling portion configured to buckle during assembly.

14. A sealing structure, comprising:

the sealing device according to claim 7;

the housing; and the rotor.

15. A method for assembling a sealing structure, the method comprising:

assembling the sealing device according to claim 7 on the housing; and assembling the rotor on an inner circumferential surface of the sealing device assembled on the housing, the inner circumferential surface being opposite to the outer circumferential surface.

16. A method for assembling a sealing structure, the method comprising:

assembling the sealing device according to claim 7 on the rotor; and assembling the housing on the sealing device assembled on the rotor.

* * * * *